US008340870B2

(12) United States Patent
Ohshima et al.

(10) Patent No.: US 8,340,870 B2
(45) Date of Patent: Dec. 25, 2012

(54) VEHICLE MANEUVER ASSISTANCE DEVICE

(75) Inventors: Kenichi Ohshima, Shimotsuke (JP); Yukihiro Fujiwara, Utsunomiya (JP); Yoshitaka Katashima, Utsunomiya (JP); Hiroyuki Kawagoe, Kawachi-gun (JP); Shigenobu Saigusa, Utsunomiya (JP); Yasushi Shoda, Utsunomiya (JP); Manabu Shimizu, Utsunomiya (JP); Yasuhiro Konishi, Kawagoe (JP)

(73) Assignee: Honda Motor Co., Ltd., Tokyo (JP)

( * ) Notice: Subject to any disclaimer, the term of this patent is extended or adjusted under 35 U.S.C. 154(b) by 658 days.

(21) Appl. No.: 12/584,734

(22) Filed: Sep. 11, 2009

(65) Prior Publication Data

US 2010/0070139 A1 Mar. 18, 2010

(30) Foreign Application Priority Data

Sep. 16, 2008 (JP) ................................ 2008-236523
Sep. 16, 2008 (JP) ................................ 2008-236524
Sep. 16, 2008 (JP) ................................ 2008-236881

(51) Int. Cl.
*G06F 7/00* (2006.01)

(52) U.S. Cl. ........................................... 701/42; 701/36

(58) Field of Classification Search .............. 701/41–42, 701/36; 348/148; 180/6.2, 167–169, 204, 180/199; 340/932.2, 901; 280/761
See application file for complete search history.

(56) References Cited

U.S. PATENT DOCUMENTS 6,344,805 B1 2/2002 Yasui et al.
7,592,928 B2 9/2009 Chinomi et al.
7,620,495 B2 11/2009 Minagawa et al.
2001/0030688 A1 10/2001 Asahi et al.
2005/0012685 A1* 1/2005 Okada et al. .................... 345/32
2006/0287825 A1 12/2006 Shimizu et al.
2010/0066833 A1* 3/2010 Ohshima et al. .............. 348/148
2010/0153111 A1 6/2010 Hirai et al.

FOREIGN PATENT DOCUMENTS

EP 1 050 866 A1 11/2000
EP 1 731 366 A1 12/2006
JP 11-283199 10/1999
JP 2001-006097 A 1/2001
JP 2001-180405 A 7/2001
JP 2002-120678 A 4/2002
JP 2003-063338 A 3/2003
JP 2003-148974 A 5/2003
JP 2003-248656 A 9/2003
JP 2004-023365 A 1/2004

(Continued)

*Primary Examiner* — Yonel Beaulieu
(74) *Attorney, Agent, or Firm* — Carrier Blackman & Associates, P.C.; William D. Blackman; Joseph P. Carrier

(57) ABSTRACT

The vehicle maneuver assistance device includes: a plurality of external environment imaging units; a converter that performs a view point conversion; a display unit provided in an interior of the present-vehicle; a steering angle status value detector which detects status values of the steering angle representing an actual steering angle of the present-vehicle, and outputs a steering angle status value; a display controller that causes the display unit to display the converted image, and, overlaid thereon, a guidance display which assists a parking maneuver of the present-vehicle, wherein the display controller controls the guidance display according to the steering angle status value, so that the guidance display includes: an initial positioning guide line representing an initial location of the present-vehicle at the beginning of the parking maneuver; and a steering-switching start positioning guide line representing a starting location of a quick steering direction switching.

13 Claims, 28 Drawing Sheets

10
11 EXTERNAL CAMERA
11a FRONT CAMERA
11b REAR CAMERA
11c LEFT CAMERA
11d RIGHT CAMERA
12 NEAR-INFRARED LED
13 VEHICLE STATE SENSOR
31 WHEEL SPEED SENSOR
32 STEERING ANGLE SENSOR
33 SHIFT POSITION SENSOR
14 NAVIGATION DEVICE
20 IMAGE PROCESSING APPARATUS
42 IMAGE PROCESSING UNIT
45 DISPLAY CONTROL UNIT
41 LED CONTROL UNIT
44 STORAGE UNIT
19 DISPLAY DEVICE
15 OPERATING SWITCH
16 SWITCH
17 RETRACTION SWITCH
18 SIDE MIRROR ACTUATOR

FOREIGN PATENT DOCUMENTS

| | | | |
|---|---|---|---|
| JP | 2004-106615 | A | 4/2004 |
| JP | 2004-345528 | A | 12/2004 |
| JP | 2006-001301 | A | 1/2006 |
| JP | 2007-071946 | A | 3/2007 |
| JP | 2008-203017 | A | 9/2008 |
| WO | 2007/069573 | A1 | 6/2007 |

* cited by examiner

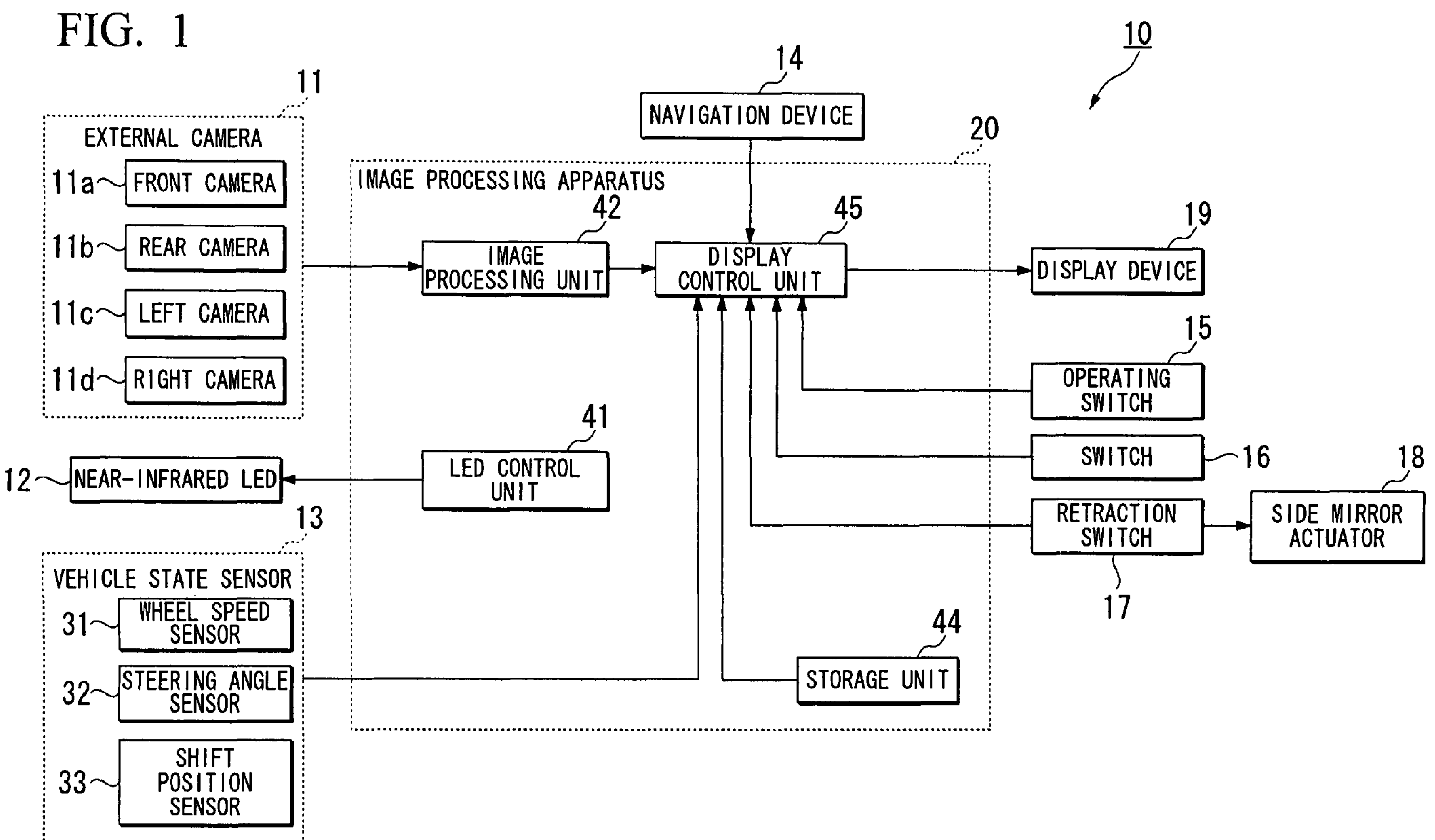
FIG. 1
10
EXTERNAL CAMERA
11
11a FRONT CAMERA
11b REAR CAMERA
11c LEFT CAMERA
11d RIGHT CAMERA
12 NEAR-INFRARED LED
13
VEHICLE STATE SENSOR
31 WHEEL SPEED SENSOR
32 STEERING ANGLE SENSOR
33 SHIFT POSITION SENSOR
20
IMAGE PROCESSING APPARATUS
42 IMAGE PROCESSING UNIT
41 LED CONTROL UNIT
45 DISPLAY CONTROL UNIT
44 STORAGE UNIT
14 NAVIGATION DEVICE
19 DISPLAY DEVICE
15 OPERATING SWITCH
16 SWITCH
17 RETRACTION SWITCH
18 SIDE MIRROR ACTUATOR

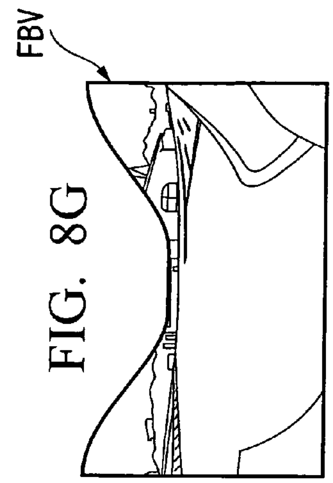
FIG. 8G
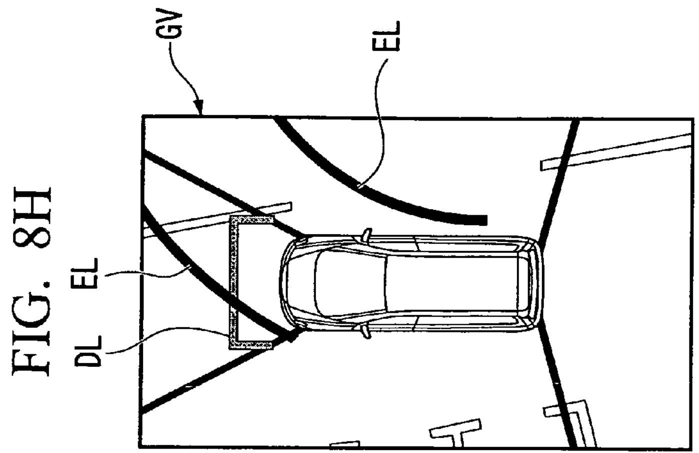
FIG. 8H
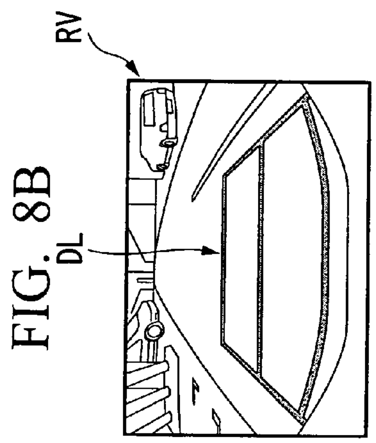
FIG. 8B
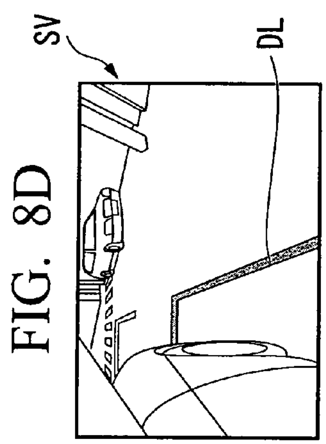
FIG. 8D
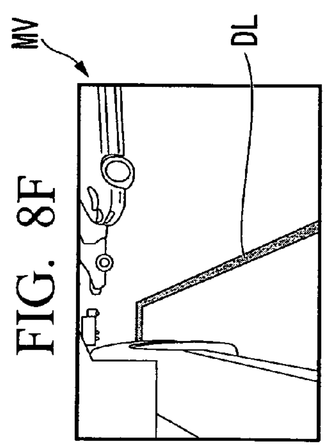
FIG. 8F
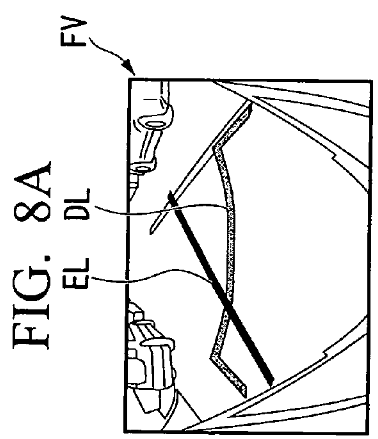
FIG. 8A
SV
DL
FIG. 8C
MV
DL
FIG. 8E ra
sa
DL fa
sa
DL

VEHICLE MANEUVER ASSISTANCE DEVICE

BACKGROUND OF THE INVENTION

1. Field of the Invention

The present invention relates to a vehicle maneuver assistance device.

Priority is claimed on Japanese Patent Application No. 2008-236881, filed Sep. 16, 2008, Japanese Patent Application No. 2008-236523, filed Sep. 16, 2008, and Japanese Patent Application No. 2008-236524, filed Sep. 16, 2008, the content of which are incorporated herein by reference.

2. Description of Related Art

In a related art, a steering maneuver assistance device has been known, which displays an image shot by a camera in a rear direction of a vehicle, and, overlaid thereon, a guidance display assisting a parking vehicle maneuver (e.g., see Japanese Unexamined Patent Application, First Publication 2001-180405).

This steering maneuver assistance device displays, as the guidance display, a steering maneuver starting guide line that notifies a steering maneuver starting point for the parking maneuver, and an eye-mark that notifies a steering-switching point. The steering-switching point may represent, for example, an appropriate location at which the driver quickly turn the steering in the opposite direction, in order to perform the parking operation. The steering maneuver starting guide line is a line with a predetermined length, while the eye-mark has a circular shape. These signs guide the driver to maneuver the vehicle at the steering maneuver start timing and at the steering-switching start timing, respectively, so that each mark overlaps on positions of the target points that are defined at the far corners in the parking space.

In another related art, a vehicle maneuver assistance device has been known, which displays an image outputted from a camera shooting the vehicle forward direction, and overlaid thereon, a guidance display which assists parking vehicle maneuver, e.g., a guideline showing the estimated course of the vehicle, and another guideline showing the vehicle width, such that the overlaid display can be turned on/off according to the instruction of the operator (e.g., see Japanese Unexamined Patent Application, First Publication 2001-6097.

In another related art, a parking assistance device has been known, which assists the operator's parking maneuver by calculating an ideal driving course according to the parking space, and displaying visual diagrams representing this ideal driving course, the ideal steering maneuver angle along this driving course, and the difference amount of the actual steering maneuver angle from the ideal steering maneuver angle (e.g., see Japanese Unexamined Patent Application, First Publication H11-283199).

However, the steering maneuver assistance device according to the aforementioned related arts, merely displays the guidance display assisting the maneuver overlaid on the image outputted from the rear camera. Accordingly, as the vehicle position changes while the parking maneuver is performed, there are occasions where the visual recognition of the relationship between the parking space and the guidance display becomes hard. Moreover, it is not easy to maneuver the vehicle so as to match the circular eye-mark and the target points of the parking space. Therefore, there is a problem in that the operator is required to perform a difficult maneuver operation. Moreover, the target points corresponding to the steering maneuver starting guide line and the circular eye-mark are defined in the far corners of the parking space. Therefore, the target points are positioned at a far position in the monitor display and not easy to recognize. Therefore, there is a concern in that the convenience in the maneuver operation is not optimum.

The present invention is achieved in view of the aforementioned circumstances, and a first object thereof is to provide a vehicle maneuver assistance device which appropriately assists the maneuver operation of the operator, and thereby able to increase the convenience.

Moreover, in the steering maneuver assistance device according to the aforementioned related arts, the display on/off of each of the guidelines is designed to be manually switchable according to an operator's instruction. However, even in cases where the required guideline changes according to the status of the vehicle maneuver, unless the operator explicitly inputs such manual commands, unnecessary guidelines are maintained to be displayed. Accordingly, the display becomes unnecessarily complicated, and complicated manipulations for turning off the unwanted guidelines are required.

The present invention is achieved in view of the aforementioned circumstances, and a second object thereof is to provide a vehicle maneuver assistance device which appropriately assists the operator's maneuver operation and increase the convenience.

Moreover, the steering maneuver assistance device according to the aforementioned related arts merely visually displays the ideal steering maneuver angle and the difference amount of the actual steering maneuver angle from the ideal steering maneuver angle. Therefore, the operator is required to continuously check the difference amount of the actual steering maneuver angle, and to perform the steering maneuver so that the difference amount is maintained to be zero. Therefore, there is a problem in that the complicated maneuver operation is required, and that a considerable experience is required to perform appropriate maneuver operations. Moreover, it is not feasible for the operator to particularly recognize the maneuver operation required to perform, which changes depending on the relative locations of the parking space and the vehicle, only from the displayed diagrams related to the steering maneuver angle. It is also not feasible to recognize the sequence of the maneuver operation required to perform from the beginning of the parking maneuver through the completion thereof. Therefore, there is a concern in that an appropriate maneuver operation becomes difficult.

The present invention is achieved in view of the aforementioned circumstances, and a third object thereof is to provide a vehicle maneuver assistance device which enables an appropriate assist of the operator's maneuver operation and an increase of the convenience.

SUMMARY OF THE INVENTION (1) In order to resolve the aforementioned object, in a first aspect of the present invention, a vehicle maneuver assistance device includes: a plurality of imaging units that images an external environment of a present-vehicle, and outputs resulting original images; a converter that performs a view point conversion on the original images and outputs resulting converted images; a display unit provided in an interior of the present-vehicle; a steering angle status value detector which detects status values of the steering angle representing an actual steering angle of the present-vehicle, and outputs a steering angle status value; a display controller that causes the display unit to display the converted image, and, overlaid thereon, a guidance display which assists a parking maneuver of the present-vehicle, wherein the display controller controls the guidance display according to the steering angle status value, so that the guidance display includes: an initial positioning guide line representing an initial location of the present-vehicle at the beginning of the parking maneuver; and a steering-switching start positioning guide line representing a starting location of a quick steering direction switching.

(2) In the vehicle maneuver assistance device according to the first aspect of the present invention, the display controller may control the guidance display so that, when the parking maneuver is a parallel parking, a parallel parking initial positioning guide line is displayed as the initial positioning guide line; and the parallel parking initial positioning guide line is arranged so that, when the parallel parking initial positioning guide line is positioned at one of corner parts of a parking frame closest to the present-vehicle, the present-vehicle is positioned at an appropriate parallel parking initial location.

(3) In the vehicle maneuver assistance device according to the first aspect of the present invention, the display controller may control the guidance display so that, when the parking maneuver is a back-in parking, a backup parking initial positioning guide line is displayed as the initial positioning guide line; and the backup parking initial positioning guide line is arranged so that, when the backup parking initial positioning guide line is positioned at an essentially central position of the parking frame, the present-vehicle is positioned at an appropriate back-in parking initial location.

(4) In order to resolve the aforementioned object, in a second aspect of the present invention, a vehicle maneuver assistance device includes: a plurality of imaging units that images an external environment of a present-vehicle, and outputs resulting original images; a display unit provided in an interior of the present-vehicle; a steering angle status value detector which detects status values of the steering angle representing an actual steering angle of the present-vehicle, and outputs a steering angle status value; a display controller that is capable of causing the display unit to display the converted image and, overlaid thereon, a guidance display which assists a parking maneuver of the present-vehicle, and at least one of a prediction guidance display representing a driving course of the present-vehicle predicted according to the steering angle status value, and an indicator guidance display representing a location apart from the present-vehicle by a predetermined distance, wherein the display controller clears a display of the prediction guidance display and the indicator guidance display, when a predetermined parking maneuver is performed.

(5) In order to resolve the aforementioned object, in a third aspect of the present invention, a vehicle maneuver assistance device includes: a plurality of imaging units that images an external environment of a present-vehicle, and outputs resulting images; a display unit provided in an interior of the present-vehicle; and a display controller that causes the display unit to display the images and, overlaid thereon, a guidance display which assists a parking maneuver of the present-vehicle, wherein: the display controller causes the display unit to display a help display including instructions for a maneuver operation during the parking maneuver; and the display controller causes the display unit to emphasize the display corresponding to a present operation among a plurality of operations included in the maneuver operation.

(6) In the vehicle maneuver assistance device according to the third aspect of the present invention, the display controller, when emphasizing the display corresponding to the present operation, may increase a contrast of the corresponding display.

(7) In the vehicle maneuver assistance device according to the third aspect of the present invention, the display controller, when emphasizing the display corresponding to the present operation, may increase a size of the corresponding display.

(8) In the vehicle maneuver assistance device according to the third aspect of the present invention, the display controller, when emphasizing the display corresponding to the present operation, may change a color of the corresponding display.

(9) In the vehicle maneuver assistance device according to the third aspect of the present invention, the display controller arranges the help display at a position not interfering with the guidance display.

According to the aforementioned vehicle maneuver assistance device of (1), even during the vehicle is moving, a converted image can be defined (e.g., a view looking down from a upper position than the vehicle), causing an improved visual recognition for the driver.

Moreover, the initial positioning guide line and the steering-switching start positioning guide line result in easy operations in maneuver operations in which the driver is required to position predetermined target positions to the positioning guide lines, increasing the convenience for the driver.

According to the aforementioned vehicle maneuver assistance device of (2), the driver is merely required to maneuver the vehicle so that the parallel parking initial positioning guide line is positioned at one of corner parts of the parking frame closest to the present-vehicle, in order to appropriately park the vehicle. Therefore, as compared to a system wherein the target marker position is assigned at other corners than the one closest to the present-vehicle, the driver can easily recognize the required maneuver operation. Moreover, in the displayed image of the display unit, the target position can be easily recognized, resulting in easy maneuver operations, increasing the convenience for the driver.

According to the aforementioned vehicle maneuver assistance device of (3), the driver is merely required to maneuver the vehicle so that the backup parking initial positioning guide line is positioned at an essentially central position of the parking frame, in order to appropriately park the vehicle. Therefore, as compared to a system wherein the target marker position is assigned at an arbitraly predetermined location marker and the driver is required to refer to the location marker, the driver can easily recognize the required maneuver operation. This constitution results in easy maneuver operations, increasing the convenience for the driver.

According to the aforementioned vehicle maneuver assistance device of (4), even when the driver unintentionally left the prediction guidance display and the indicator guidance display and started a parking maneuver, the prediction guidance display and the indicator guidance display are automatically cleared. In this case, the unit can prevent the prediction guidance display and the indicator guidance display from unintentionally hindering the visibility of the parking guidance display. This constitution results in easy maneuver operations, increasing the convenience for the driver.

According to the aforementioned vehicle maneuver assistance device of (5), the operator can appropriately recognize the required maneuver operation required at an appropriate timing according to the relative location of the parking space and the vehicle, and therefore, an appropriate maneuver operation can be easily performed. The driver can easily recognize the series of driving operations through the beginning to the end of the parking operation. Thereby, convenience of the driver can be improved.

According to the aforementioned vehicle maneuver assistance device of (9), by displaying the help display HELP at a position so as not to interfere with the area of the display in which the guide displays are superimposed, the driver can appropriately recognize the help display HELP, while easily visually comparing the help display HELP and the converted images representing the actual external surrounding area.

BRIEF DESCRIPTION OF THE DRAWINGS

FIG. 1 is a configuration diagram of a vehicle maneuver assistance device according to an embodiment of the invention.

FIG. 8A is a diagram showing an example of converted images which are output from an image processing unit in the vehicle maneuver assistance device according to the embodiment of the invention.

FIG. 8B is a diagram showing an example of converted images which are output from an image processing unit in the vehicle maneuver assistance device according to the embodiment of the invention.

FIG. 8C is a diagram showing an example of converted images which are output from an image processing unit in the vehicle maneuver assistance device according to the embodiment of the invention.

FIG. 8D is a diagram showing an example of converted images which are output from an image processing unit in the vehicle maneuver assistance device according to the embodiment of the invention.

FIG. 8E is a diagram showing an example of converted images which are output from an image processing unit in the vehicle maneuver assistance device according to the embodiment of the invention.

FIG. 8F is a diagram showing an example of converted images which are output from an image processing unit in the vehicle maneuver assistance device according to the embodiment of the invention.

FIG. 8G is a diagram showing an example of converted images which are output from an image processing unit in the vehicle maneuver assistance device according to the embodiment of the invention.

FIG. 8H is a diagram showing an example of converted images which are output from an image processing unit in the vehicle maneuver assistance device according to the embodiment of the invention.

DETAILED DESCRIPTION OF THE INVENTION

Figure 2:
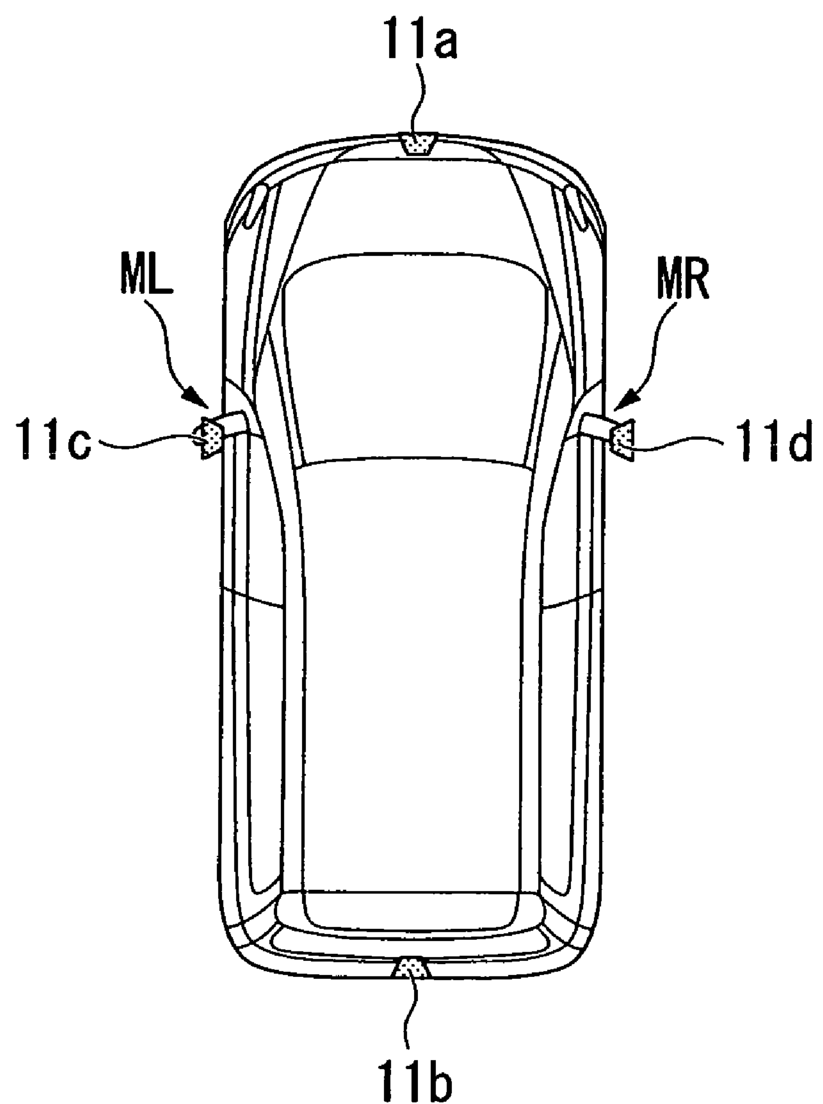
FIG. 2 is a diagram showing the arrangement of an external camera in the vehicle maneuver assistance device according to the embodiment of the invention.

A vehicle maneuver assistance device according to an embodiment of the invention will be described with reference to the accompanying drawings.

As shown in FIG. 1, a vehicle maneuver assistance device 10 according to the embodiment includes an external camera 11 (imaging unit), a near-infrared LED 12, a vehicle state sensor 13, a navigation device 14, an operating switch 15, a switch (selector) 16, a retraction switch 17, a side mirror actuator 18, a display device (display unit) 19, and an image processing apparatus 20. The display device 19 is installed in an interior of the vehicle. The image processing apparatus 20 has an electronic circuit including a CPU and the like. The vehicle maneuver assistance device 10 is installed in a vehicle and captures images of the external environment of the vehicle by the external camera 11.

As shown in FIG. 2, the external camera 11 includes a front camera 11*a* (imaging unit), a rear camera 11*b* (imaging unit), a left camera 11*c* (imaging unit), and a right camera 11*d* (imaging unit). The imaging region of the front camera 11*a* is a front peripheral region in the external environment of the vehicle. The imaging region of the rear camera 11*b* is a rear peripheral region in the external environment of the vehicle. The imaging regions of the left camera 11*c* and the right camera 11*d* are left and right peripheral regions in the external environment of the vehicle, respectively. The cameras 11*a*, 11*b*, 11*c*, and 11*d* can capture images from a visible-light region to a near-infrared region. The external camera 11 performs predetermined image processing, such as filtering, binarization, and the like on the images obtained by the cameras 11*a*, 11*b*, 11*c*, and 11*d*. The external camera 11 generates image data of pixels in a two-dimensional array and outputs the image data to the image processing apparatus 20.

The front camera 11*a* is installed at the front grille or the like of the vehicle. The rear camera 11*b* is installed at the backdoor, tailgate or the like of the vehicle. The left camera 11*c* and the right camera 11*d* are installed at the lower ends or the like of the left and right side mirrors ML and MR of the vehicle.

The near-infrared LED 12 is installed at the side mirror (for example, the left side mirror ML) and the like on the front passenger seat side of the vehicle. The near-infrared LED 12 is turned on or off under the control of the image processing apparatus 20 and irradiates a predetermined region on the front passenger seat side (for example, the imaging region of the external camera 11 on the front passenger seat side, that is, the peripheral region on the left side of the vehicle as the imaging region of the left camera 11*c*) in response to the lighting-up of the headlight (not shown) during nighttime or the like.

The vehicle state sensor 13 includes a wheel speed sensor 31, a steering angle sensor 32, a shift position sensor 33, and the like. The wheel speed sensor 31 detects, as a quantity for the vehicle state of the present-vehicle, the rotation speed (wheel speed) of the driving wheel and the like. The steering angle sensor 32 detects a steering angle (for example, the direction and degree of a steering angle input by a driver) or an actual steering angle (wheel turning angle) according to the steering angle. The shift position sensor 33 detects a shift position according to the state of a transmission mechanism (not shown) which is selected by the driver with a select lever (not shown).

The navigation device 14 carries out map matching processing on the basis of the current position of the vehicle and map data which are stored in advance. The navigation device 14 carries out processing such as route searching and route guidance with respect to a destination which is set in accordance with an input operation or the like by the operator, and outputs control commands which instruct the operations of the display device 19 and a speaker (not shown).

The operating switch 15 outputs various kinds of command signals depending on the operation selected by the driver, for example, instructions to select various kinds of menu items on the display screen of the display device 19.

The switch 16 outputs various kinds of command signals for display switching on the display screen of the display device 19 depending on the operation selected by the driver.

The retraction switch 17 outputs various kinds of command signals to the side mirror actuator 18 which carries out the retraction, extension, angle change, and the like of the left and right side mirrors ML and MR of the vehicle depending on the operation of the driver.

The display device 19 carries out various kinds of displays under the control of the image processing apparatus 20. For example, in addition to image data output from the external camera 11, the position of the present-vehicle and various kinds of guide displays can be displayed on the display screen of the display device 19 so as to be superimposed on the image data.

The image processing apparatus 20 includes, for example, an LED control unit 41, an image processing unit (image combined unit) 42, a storage unit 44, and a display control unit 45.

The LED control unit 41 controls the turning on or off of the near-infrared LED 12 in response to the lighting-up of the headlight (not shown) during nighttime or the like and in response to a period in which an image of a side view SV described below is displayed on the display screen of the display device 19.

The image processing unit 42 generates and outputs converted images corresponding to a predetermined visual field display on the basis of image data output from the respective cameras 11*a*, 11*b*, 11*c*, and 11*d* of the external camera 11 by predetermined conversion processing.

Figure 3A:
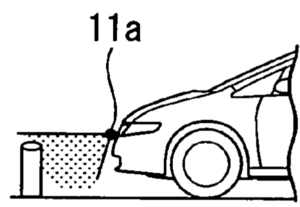
FIG. 3A is a diagram showing a predetermined external region corresponding to a visual field display in the vehicle maneuver assistance device according to the embodiment of the invention.
Figure 3B:
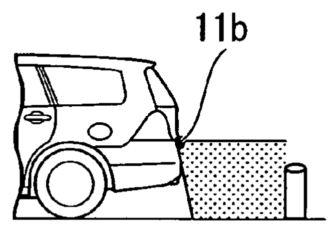
FIG. 3B is a diagram showing a predetermined external region corresponding to a visual field display in the vehicle maneuver assistance device according to the embodiment of the invention.
Figure 3C:
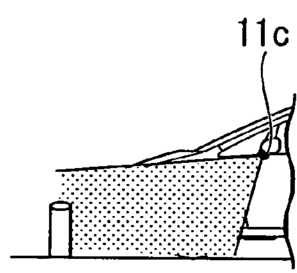
FIG. 3C is a diagram showing a predetermined external region corresponding to a visual field display in the vehicle maneuver assistance device according to the embodiment of the invention.
Figure 3D:
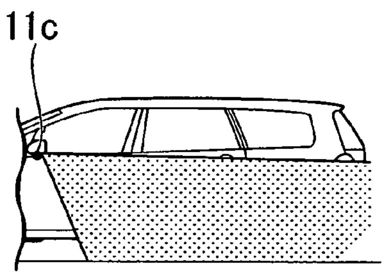
FIG. 3D is a diagram showing a predetermined external region corresponding to a visual field display in the vehicle maneuver assistance device according to the embodiment of the invention.
Figure 3E:
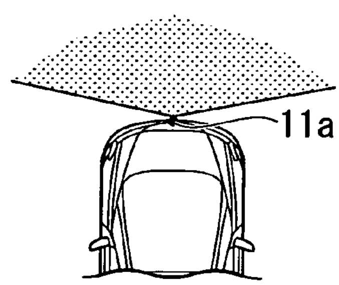
FIG. 3E is a diagram showing a predetermined external region corresponding to a visual field display in the vehicle maneuver assistance device according to the embodiment of the invention.
Figure 3F:
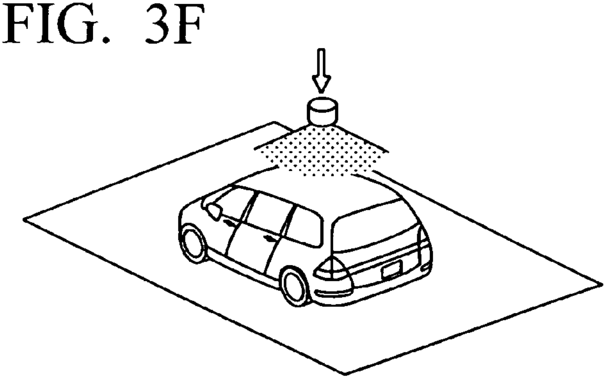
FIG. 3F is a diagram showing a predetermined external region corresponding to a visual field display in the vehicle maneuver assistance device according to the embodiment of the invention.

The predetermined visual field display includes, for example, display (front view FV) of the front region of the vehicle shown in FIG. 3A, display (rear view RV) of the rear region of the vehicle shown in FIG. 3B, display (side view SV) of the left and right front regions of the vehicle shown in FIG. 3C, display (mirror view MV) of the left and right rear regions of the vehicle shown in FIG. 3D in which the regions reflected in the left and right side mirrors ML and MR are virtually reproduced, display (front blind view FBV) shown in FIG. 3E in which the display region is expanded left and right in the front region of the vehicle, display (ground view GV) of an overhead view of the peripheral region of the vehicle shown in FIG. 3F, and the like.

Figure 4:
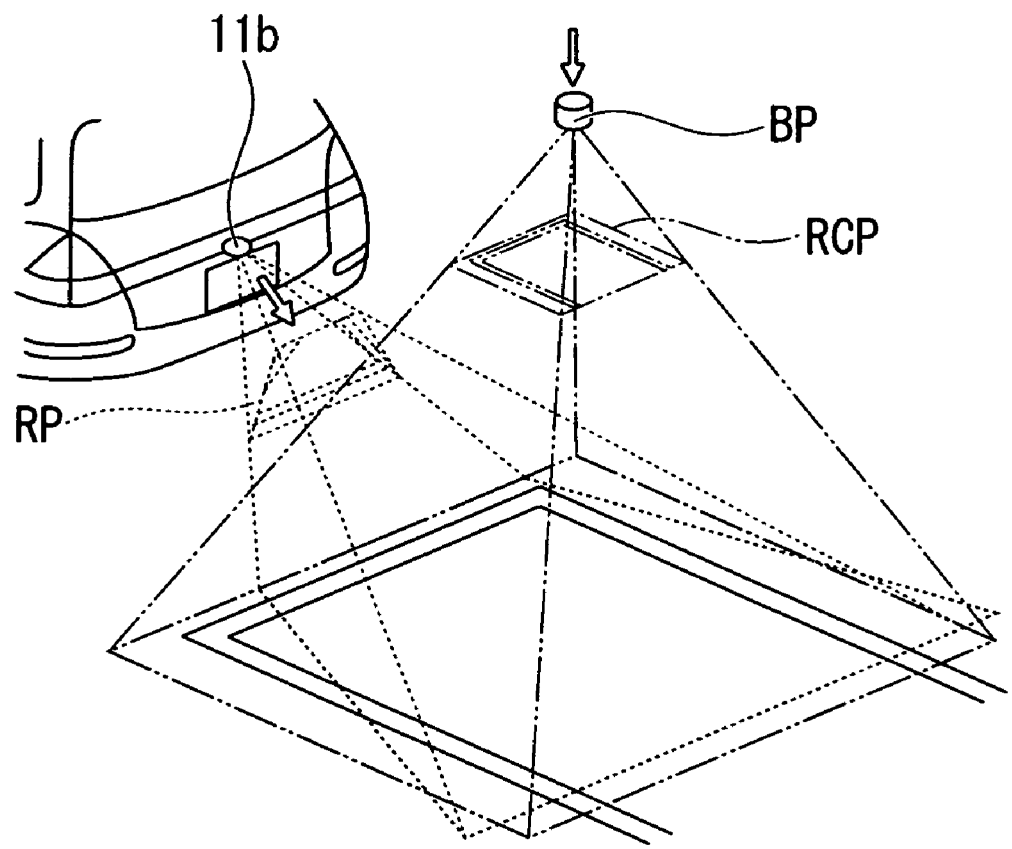
FIG. 4 is a diagram showing examples of image data RP obtained by a rear camera in the vehicle maneuver assistance device according to the embodiment of the invention and converted image data RCP obtained by viewpoint conversion with respect to the image data RP.
Figure 5B:
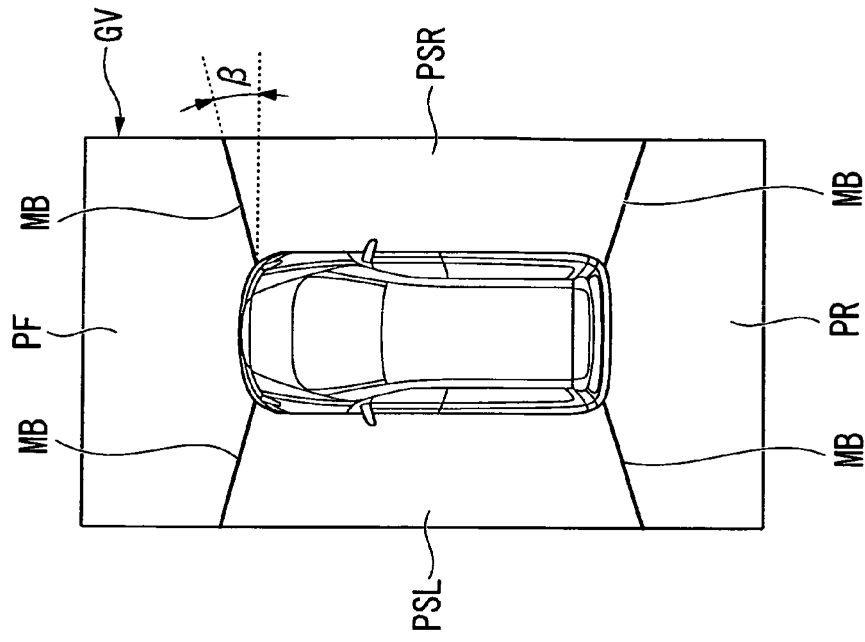
FIG. 5B is a diagram showing an image of a ground view GV according to the retraction of left and right side mirrors ML and MR in the vehicle maneuver assistance device according to the embodiment of the invention.
Figure 5A:
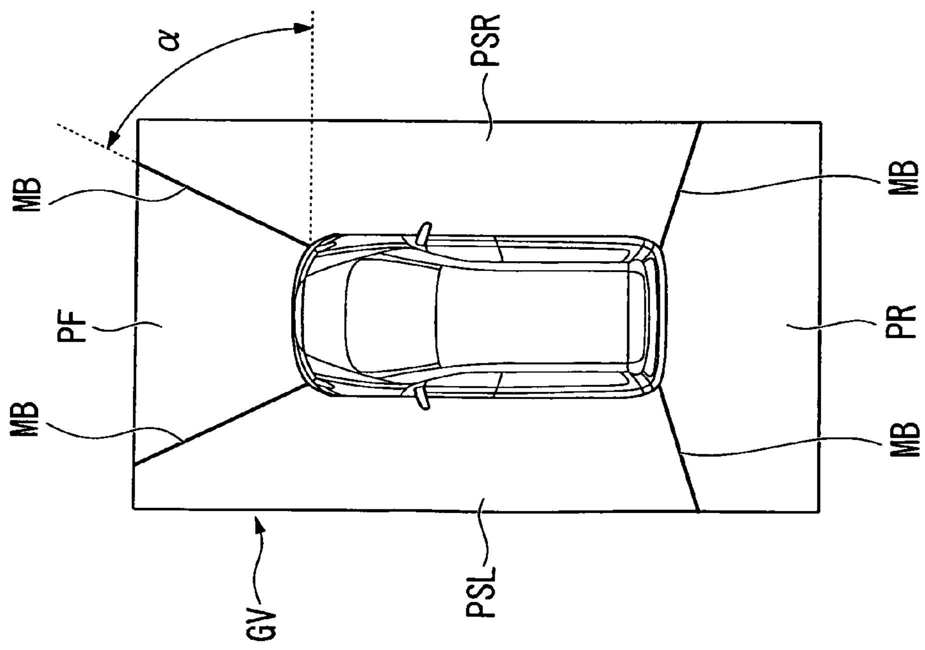
FIG. 5A is a diagram showing an image of a ground view GV corresponding to the extension of left and right side mirrors ML and MR in the vehicle maneuver assistance device according to the embodiment of the invention.
Figure 6A:
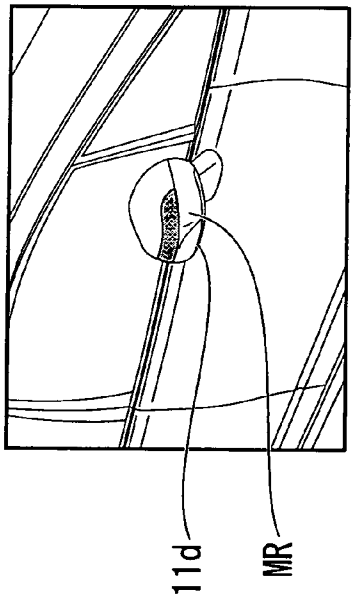
FIG. 6A is a diagram showing the extended state of a right side mirror MR in the vehicle maneuver assistance device according to the embodiment of the invention.
Figure 6B:
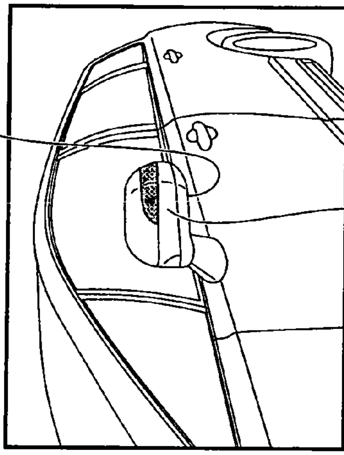
FIG. 6B is a diagram showing the extended n state of a left side mirror ML in the vehicle maneuver assistance device according to the embodiment of the invention.
Figure 6C:
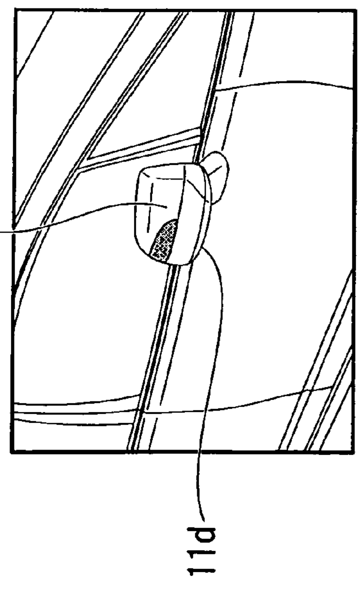
FIG. 6C is a diagram showing the retracted state of a right side mirror MR in the vehicle maneuver assistance device according to the embodiment of the invention.
Figure 6D:
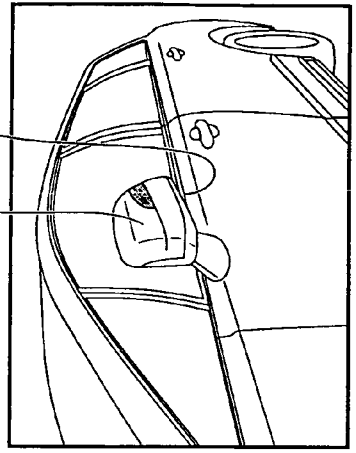
FIG. 6D is a diagram showing the retracted state of a left side mirror ML in the vehicle maneuver assistance device according to the embodiment of the invention.

When generating the image of the ground view GV, as shown in FIG. 4, the image processing unit 42 carries out viewpoint conversion on image data of the imaging regions of the respective cameras 11*a*, 11*b*, 11*c*, and 11*d* (for example, image data RP of the rear region of the vehicle shown in FIG. 4) while correcting image distortion or the like so as to provide images as viewed downward from a predetermined viewpoint BP above the vehicle in the vertical direction (for example, a converted image RCP shown in FIG. 4). An image in a predetermined field angle range for each converted image (for example, a front extracted image PF, a rear extracted image PR, a left extracted image PSL, or a right extracted image PSR) is extracted from each of the converted images obtained by the conversion processing such that the boundary positions thereof match each other. Then, as shown in FIGS. 5A and 5B, the images (the extracted images PF, PR, PSL, and PSR) are combined to generate a combined image, and the combined image is output as the image of the ground view GV. In the combined image, a predetermined mask line MB is provided at the boundary between adjacent extracted images.

When the left camera 11*c* and the right camera 11*d* of the external camera 11 are respectively provided at the lower ends of the left and right side mirrors ML and MR of the vehicle, the imaging regions of the left camera 11*c* and the right camera 11*d* change depending on the opening/closing of the left and right side mirrors ML and MR (that is, extension and retraction). For this reason, the image processing unit 42 changes the contents of the viewpoint conversion processing in accordance with the extension and retraction of the left and right side mirrors ML and MR and also changes a predetermined field angle range for each converted image (that is, the extraction ranges for extracting the extracted images PF, PR, PSL, and PSR from the respective converted images). The image of the ground view GV is generated which displays the same predetermined peripheral region by changing the boundary position between the images constituting the combined image (that is, the extracted images PF, PR, PSL, and PSR), regardless of the extension and retraction of the left and right side mirrors ML and MR.

As shown in FIGS. 6A to 6D, when the left and right side mirrors ML and MR in the extended state are retracted, the ends of the side mirrors ML and MR are moved upward in the vertical direction, so the inclination angles of the side mirrors ML and MR with respect to the horizontal direction may be changed. The cameras 11*c* and 11*d* are set to capture the images of only the peripheral regions on the left and right sides of the vehicle in the extended state of the left and right side mirrors ML and MR. However, the imaging regions of the cameras 11*c* and 11*d* unnecessarily include the left and right portions of the vehicle main body and are shifted to the rear side of the vehicle in the retracted state of the left and right side mirrors ML and MR.

Figure 7A:
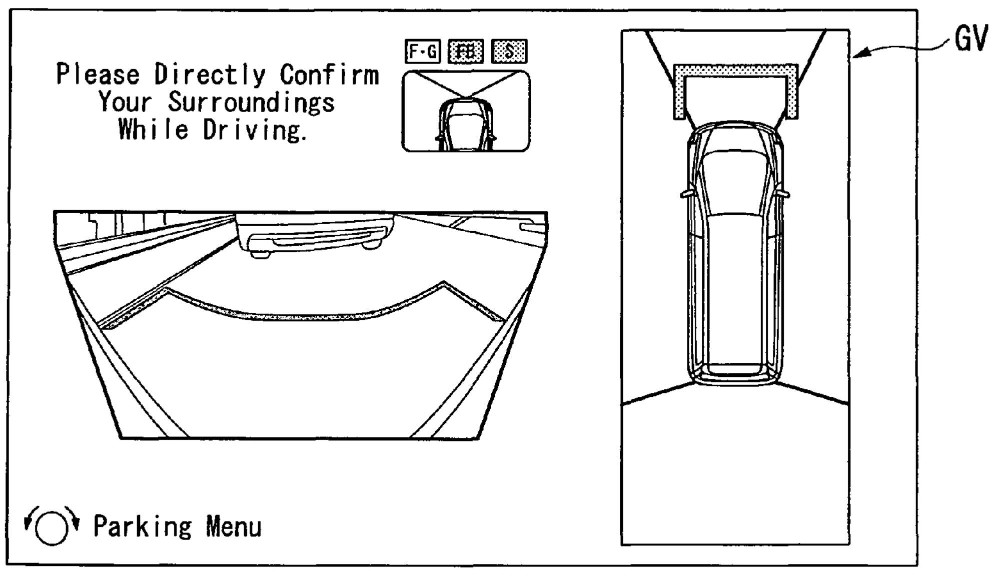
FIG. 7A is an image of a ground view GV in the extended state of left and right side mirrors ML and MR in the vehicle maneuver assistance device according to the embodiment of the invention.
Figure 7B:
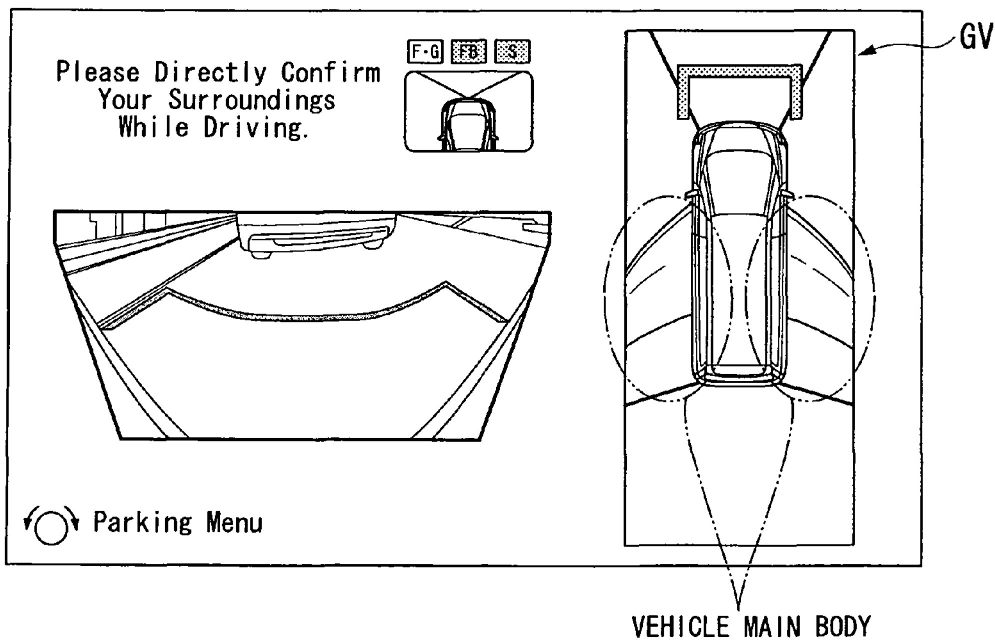
FIG. 7B is an image of a ground view GV in the retracted state of left and right side mirrors ML and MR in the vehicle maneuver assistance device according to a comparative example of the embodiment of the invention.

Accordingly, if the image of the ground view GV in the retracted state of the left and right side mirrors ML and MR (for example, the image of the ground view GV in the retracted state shown in FIG. 7B) is generated by the same processing (that is, the same viewpoint conversion processing, and the processing for aligning the extraction ranges for extracting the extracted images PSL and PSR and the boundary positions between the extracted images PF, PR, PSL, and PSR constituting the combined image) as the processing for generating the image of the ground view GV in the extended state of the left and right side mirrors ML and MR (for example, the image of the ground view GV in the extended state shown in FIG. 7A), an appropriate image as viewed downward from a predetermined viewpoint BP may not be obtained. Further, the predetermined peripheral regions on the left and right sides of the vehicle may not be displayed, and the boundary positions may be misaligned with respect to other extracted images PF and PR constituting the combined image.

For this reason, the image processing unit 42 first changes the contents of the viewpoint conversion processing in accordance with the extension and retraction of the left and right side mirrors ML and MR. The image processing unit 42 also changes the predetermined field angle range for each converted image (that is, the extraction ranges for extracting the extracted images PF, PR, PSL, and PSR from the respective converted images). Thus, appropriate extracted images PSL and PSR are extracted which display the same predetermined peripheral regions on the left and right sides of the vehicle as viewed downward from a predetermined viewpoint BP, regardless of the extension and retraction of the left and right side mirrors ML and MR.

The imaging regions of the cameras 11*c* and 11*d* in the retracted state of the left and right side mirrors ML and MR may be shifted to the rear side of the vehicle compared to the extended state of the left and right side mirrors ML and MR, so a region that cannot be imaged may be generated. With regard to this region, the boundary positions between the front extracted image PF, the left extracted image PSL, and the right extracted image PSR are especially shifted to the rear side of the vehicle in the retracted state of the left and right side mirrors ML and MR as shown in FIG. 5B compared to the extended state of the left and right side mirrors ML and MR shown in FIG. 5A. In this way, the boundary positions between the extracted images PF, PSL, and PSR in the combined image are changed. In response to the change in the boundary positions, the extraction ranges for extracting the extracted images PF, PR, PSL, and PSR from the respective converted images are changed in advance.

In the extended state of the left and right side mirrors ML and MR shown in FIG. 5A, the mask line MB which indicates each boundary position between the front extracted image PF, the left extracted image PSL, and the right extracted image PSR is inclined forward at a first predetermined angle α with respect to the left-right direction of the vehicle. Meanwhile, in the retracted state of the left and right side mirrors ML and MR shown in FIG. 5B, the mask line MB which indicates each boundary position between the front extracted image PF, the left extracted image PSL, and the right extracted image PSR is inclined forward at a second predetermined angle β (<α) smaller than the first predetermined angle α with respect to the left-right direction of the vehicle. Thus, the extraction region of the front extracted image PF is expanded and the extraction regions of the left extracted image PSL and the right extracted image PSR are reduced in the retracted state compared to the extended state of the left and right side mirrors ML and MR.

The image processing unit 42 outputs, for example, the converted images of a front view FV shown in FIG. 8A, a rear view RV shown in FIG. 8B, left and right side views SV shown in FIGS. 8C and 8D, left and right mirror views MV shown in FIGS. 8E and 8F, a front blind view FBV shown in FIG. 8G, and a ground view GV shown in FIG. 8H.

The display control unit 45 displays a navigation screen according to various kinds of operations of the navigation device 14 on the display screen of the display device 19.

The display control unit 45 displays the converted images on the display screen of the display device 19 by a predetermined combination set in advance, a predetermined combination according to command signals output from the operating switch 15 or the switch 16, or a predetermined combination according to detection signals output from the vehicle state sensor 13.

When displaying the converted images output from the image processing unit 42 on the display screen of the display device 19, the display control unit 45 acquires various kinds of messages and images stored in the storage unit 44 and displays the messages or images on the display screen of the display device 19. At the same time, various kinds of guide displays for assisting the driving of the driver (for example, an indicator guide line DL concerning a predetermined position at the periphery of the vehicle shown in FIGS. 8A to 8F and 8H, an expected guide line EL concerning the traveling trace of the vehicle shown in the FIGS. 8A and 8H, and the like) are displayed so as to be superimposed on the converted images.

It is assumed that the speed of the vehicle (vehicle speed) according to the detection signal output from the wheel speed sensor 31 of the vehicle state sensor 13 is equal to or lower than a predetermined low side determination threshold value VthL, and the shift position in the detection signal output from the shift position sensor 33 is in a position (for example, a drive position for forward movement or the like) other than the reverse position for backward movement. In this case, the display control unit 45 selects four display modes, a display mode based on the combination of a front view FV and a ground view GV shown in FIG. 9A, a display mode based on a front blind view FBV shown in FIG. 9B, a display mode based on the combination of left and right side views SV shown in FIG. 9C, and a display mode based on a left side view SV shown in FIG. 9D, from among a plurality of display modes set in advance. The display control unit 45 displays one of the display modes on the display screen of the display device 19 so as to be switched in accordance with a command signal output from the switch 16.

In this case, in addition to the converted images output from the image processing unit 42, the display control unit 45 acquires display mode indication images IP, an imaging region indication image CP, various kinds of messages (for example, "Please directly confirm your surroundings while driving." and the like), menu display, help display, and the like from the storage unit 44, and displays them on the display screen of the display device 19. The display mode indication images IP displayed on the display screen represent switchable display modes. The imaging region indication image CP displayed on the display screen schematically shows the imaging region of the external camera 11 corresponding to a converted image being displayed.

The display mode indication images IP include, as switchable display modes, an image (F·G) representing the combination of the front view FV and the ground view GV, an image (FB) representing the front blind view FBV, an image (S) representing the combination of the left and right side views SV or only the left side view SV, an image (R·G) representing the combination of the rear view RV and the ground view GV, and an image (R·M) representing the combination of the rear view RV and the left and right mirror views MV. As shown in FIGS. 9A to 9D, the display mode indication image IP corresponding to a display mode being displayed on the display screen of the display device 19 is highlighted by increasing the contrast or size, or by changing the display color with respect to the display mode indication images IP corresponding to other switchable display modes.

Figure 9A:
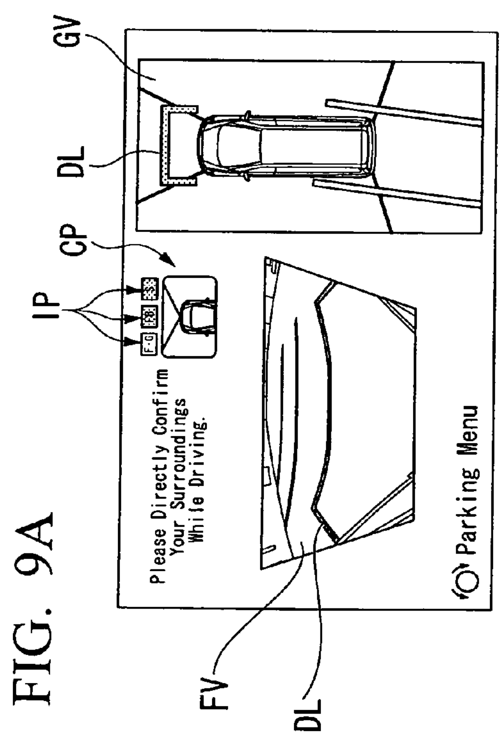
FIG. 9A is a diagram showing an example of a display screen in the vehicle maneuver assistance device according to the embodiment of the invention.
Figure 9B:
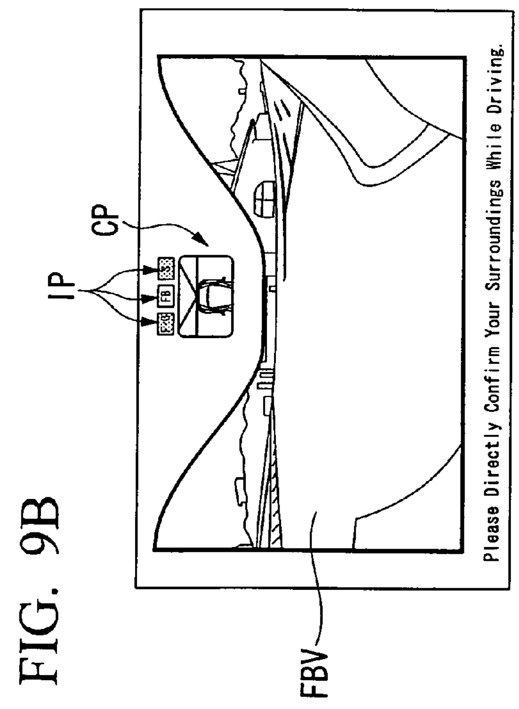
FIG. 9B is a diagram showing an example of a display screen in the vehicle maneuver assistance device according to the embodiment of the invention.
Figure 9C:
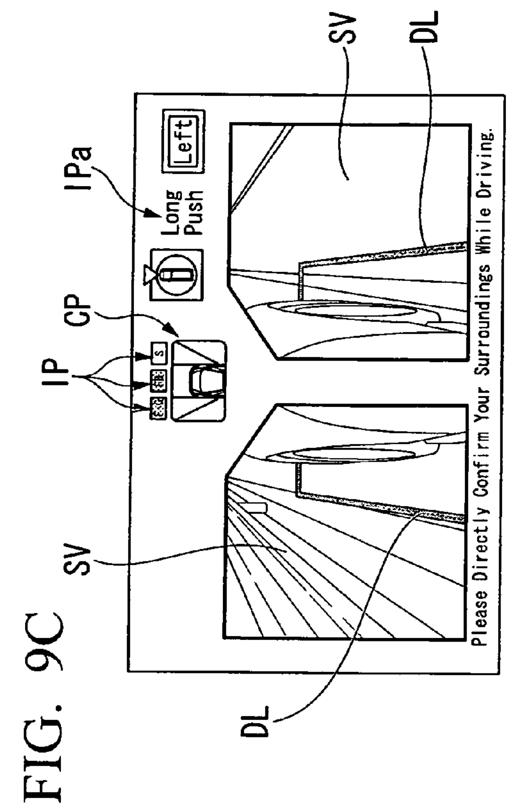
FIG. 9C is a diagram showing an example of a display screen in the vehicle maneuver assistance device according to the embodiment of the invention.
Figure 9D:
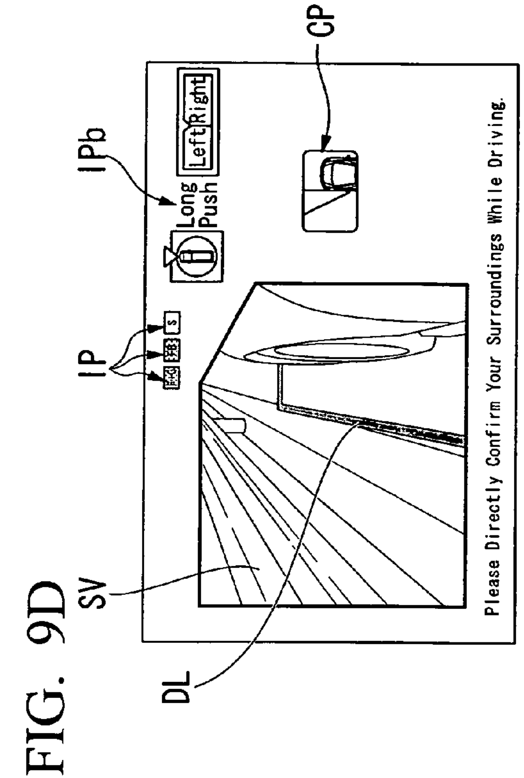
FIG. 9D is a diagram showing an example of a display screen in the vehicle maneuver assistance device according to the embodiment of the invention.

As shown in FIGS. 9C and 9D, when the image (S) representing the combination of the left and right side views SV or only the left side view SV is displayed and highlighted as the display mode indication image IP, the display control unit 45 displays a first auxiliary display mode indication image IPa or a second auxiliary display mode indication image IPb which indicates a mutually switchable display mode (that is, the display mode based on the combination of the left and right side views SV or the display mode based only on the left side view SV).

The first auxiliary display mode indication image IPa (long push: left) indicates that when the operating switch 15 is pushed for a long time, the display mode based on the combination of the left and right side views SV can be switched to the display mode based only on the left side view SV. The second auxiliary display mode indication image IPb (long push: left/right) indicates that when the operating switch 15 is pushed for a long time, the display mode based only on the left side view SV can be switched to the display mode based on the combination of the left and right side views SV.

With regard to the combination of the front view FV and the ground view GV, the display control unit 45 displays the image of the front view FV and the image of the ground view GV on the display screen of the display device 19 so as to be arranged in the left-right direction, as shown in FIG. 9A.

With regard to the combination of the rear view RV and the ground view GV, the image of the rear view RV and the image of the ground view GV are displayed on the display screen of the display device 19 so as to be arranged in the left-right direction.

With regard to the combination of the left and right side views SV, as shown in FIG. 9C, the image of the left side view SV and the image of the right side view SV are displayed on the display screen of the display device 19 so as to be arranged in the left-right direction.

Figure 10A:
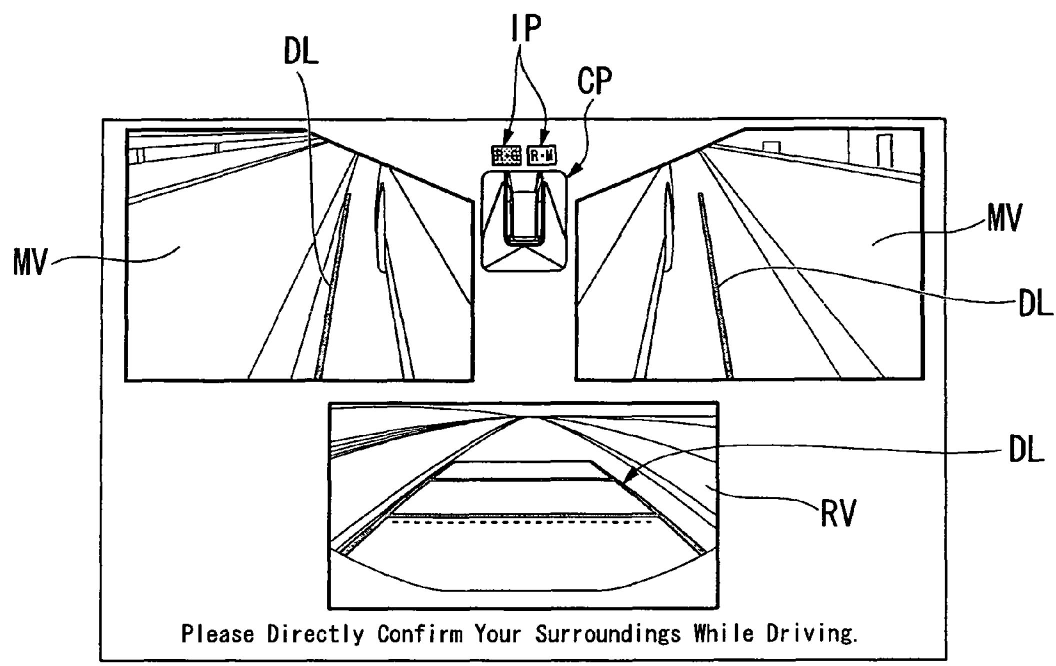
FIG. 10A is a diagram showing an example of a display screen in the vehicle maneuver assistance device according to the embodiment of the invention.
Figure 10B:
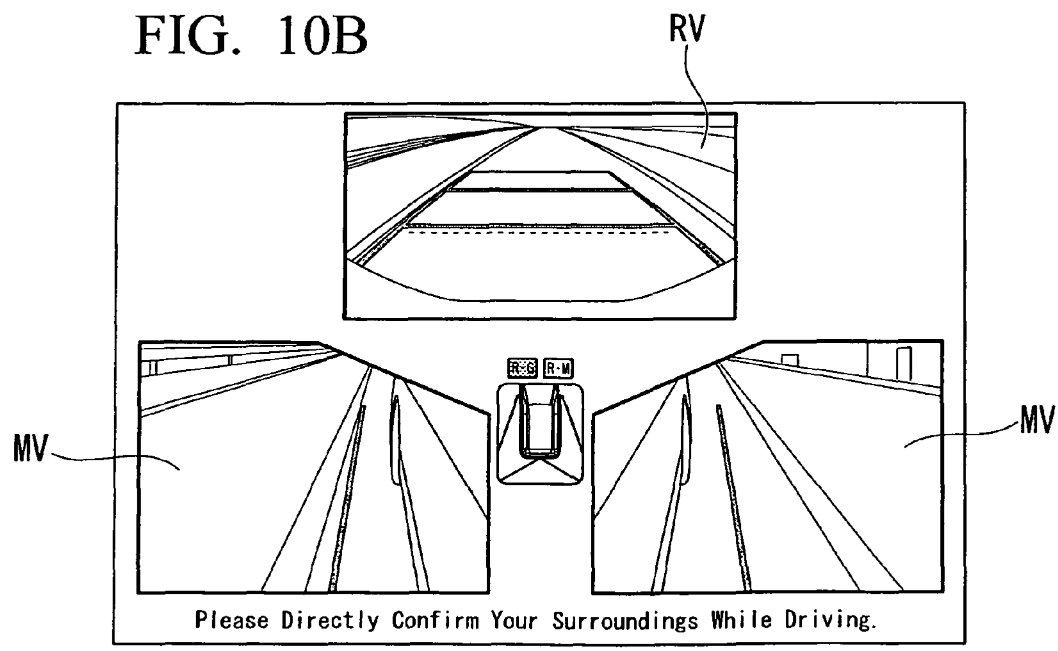
FIG. 10B is a diagram showing an example of a display screen in the vehicle maneuver assistance device according to the embodiment of the invention.

When the shift position in the detection signal output from the shift position sensor 33 is in the reverse position, the combination of the rear view RV and the left and right mirror views MV is selected. As shown in FIG. 10A, on the display screen of the display device 19, the image of the left mirror view MV and the image of the right mirror view MV are arranged in the left-right direction at the upper space, and the rear view RV is arranged at the lower space. In this case, as shown in FIG. 10B, the discomfort that the driver may feel with respect to the display mode can be suppressed, and visibility can be improved, as compared with a case where the image of the rear view RV is arranged at the upper space and the images of the left and right mirror views MV are arranged at the lower space.

The image of the ground view GV which is combined with the front view FV at the time of the forward movement of the vehicle and the image of the ground view GV which is combined with the rear view RV at the time of the backward movement of the vehicle are the same (that is, the same display mode in which the field angle ranges of the extracted images PF, PR, PSL, and PSR constituting the image of the ground view GV, the boundary positions between the extracted images, and the like are unchanged).

Figure 11:
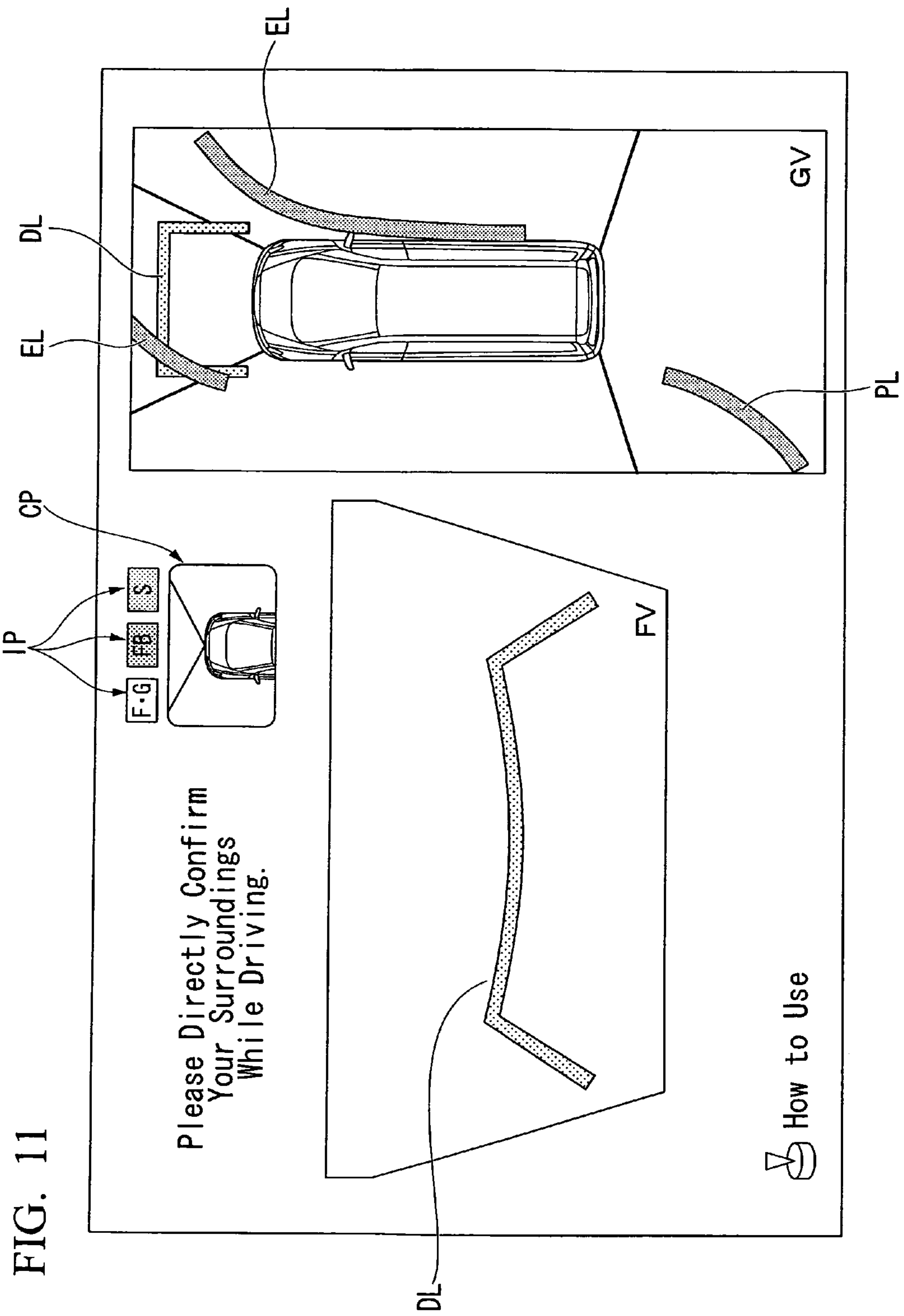
FIG. 11 is a diagram showing an example of a guide display displayed on the display screen of the vehicle maneuver assistance device according to the embodiment of the invention.

For example, as shown in FIG. 11, when converted images which are output from the image processing unit 42 are displayed on the display screen of the display device 19, the display control unit 45 superimposes various kinds of guide displays for assisting the driving of the driver on the converted images (for example, images of the front view FV, the rear view RV, the side view SV, the mirror view MV, and the ground view GV) in accordance with a command signal output from the operating switch 15.

The guide display includes, for example, an expected guide line EL, an indicator guide line DL, and a parking guide line PL.

The expected guide line EL is a guide line which represents a traveling trajectory of the vehicle to be expected in accordance with a detection signal output from a steering angle sensor 32 or the like. The expected guide line EL is superimposed on the respective images of the ground view GV, the front view FV, and the rear view RV when a steering angle detected by the steering angle sensor 32 or an actual steering angle based on the steering angle is equal to or larger than a predetermined value, and is displayed in a display color different from the indicator guide line DL described below. The expected guide line EL is not displayed when a parking operation described below is carried out (for example, at the time of backward movement while turning a steering wheel full left or right, that is, when a steering angle or an actual steering angle based on the steering angle is equal to or larger than a predetermined value around the maximum value).

Figures 12A, 12B, 12C, 12D:
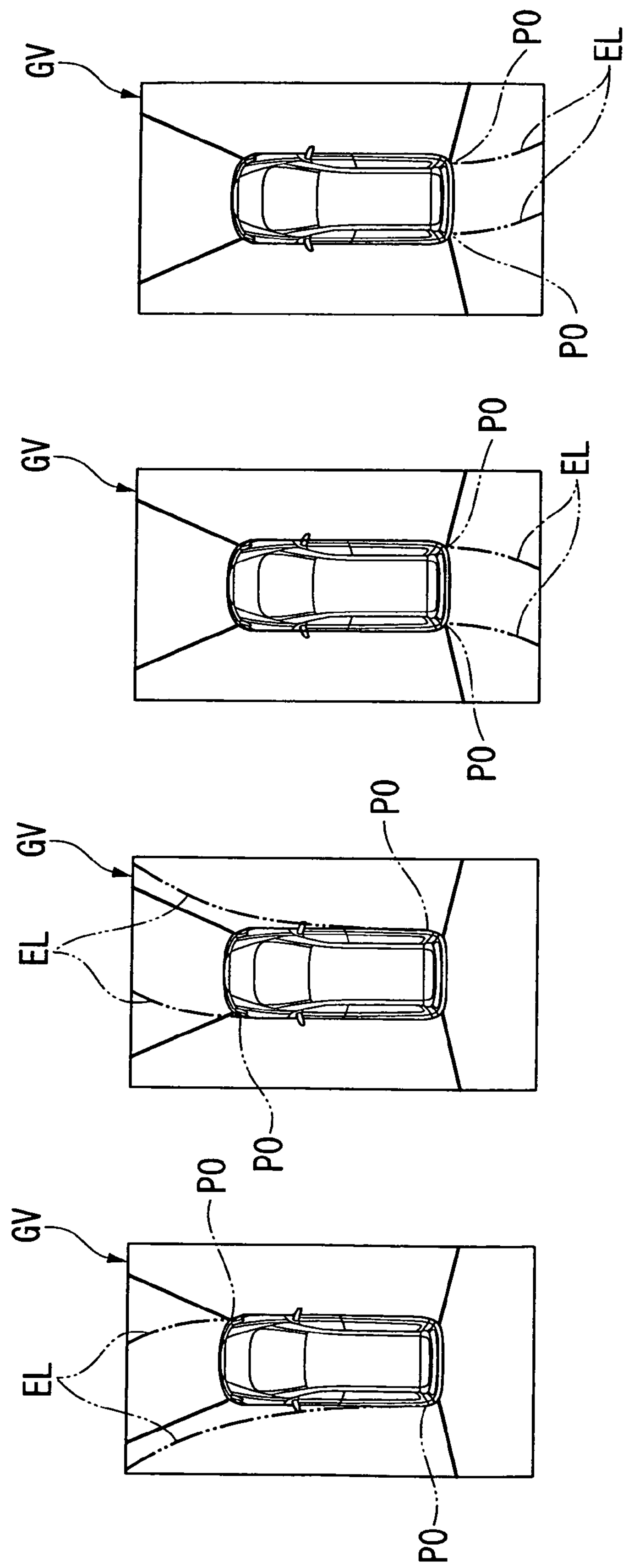
FIG. 12A is a diagram showing an example of an expected guide line EL superimposed on the image of the ground view GV displayed on the display screen of the vehicle maneuver assistance device according to the embodiment of the invention.
FIG. 12B is a diagram showing an example of an expected guide line EL superimposed on the image of the ground view GV displayed on the display screen of the vehicle maneuver assistance device according to the embodiment of the invention.
FIG. 12C is a diagram showing an example of an expected guide line EL superimposed on the image of the ground view GV displayed on the display screen of the vehicle maneuver assistance device according to the embodiment of the invention.
FIG. 12D is a diagram showing an example of an expected guide line EL superimposed on the image of the ground view GV displayed on the display screen of the vehicle maneuver assistance device according to the embodiment of the invention.
Figure 13A:
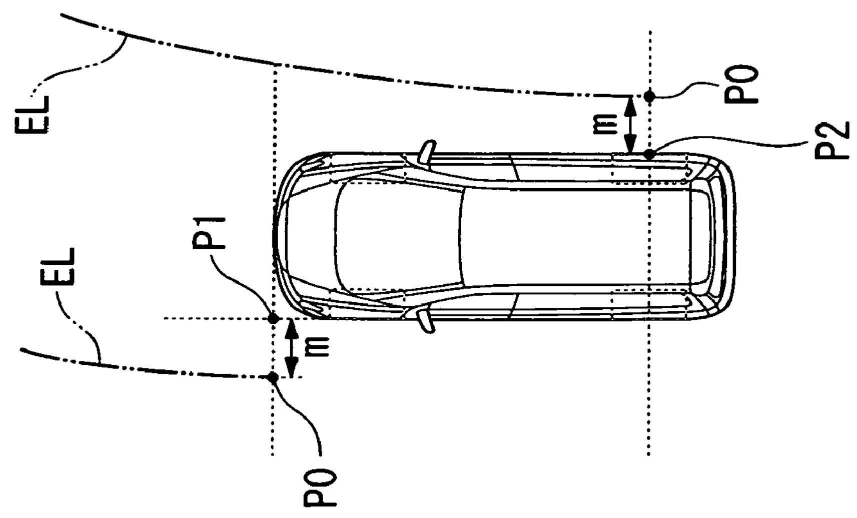
FIG. 13A is a diagram showing an example of an expected guide line EL superimposed on the image of the ground view GV displayed on the display screen of the vehicle maneuver assistance device according to the embodiment of the invention.
Figure 13B:
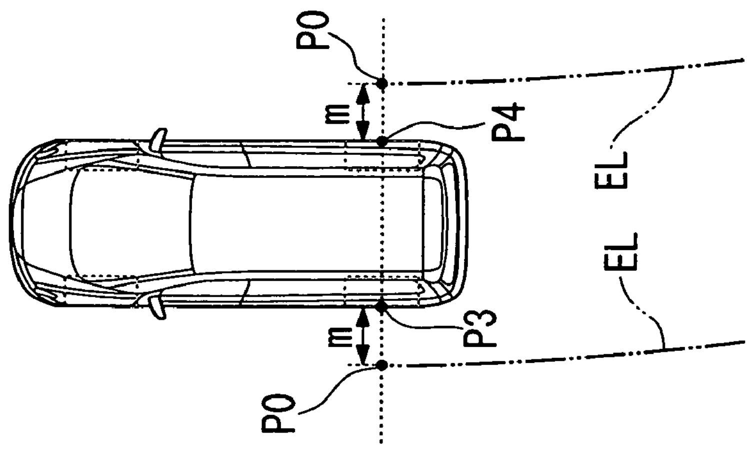
FIG. 13B is a diagram showing an example of an expected guide line EL superimposed on the image of the ground view GV displayed on the display screen of the vehicle maneuver assistance device according to the embodiment of the invention.

For example, the expected guide line EL which is superimposed on the image of the ground view GV has a display start point P0 at a predetermined margin distance m with respect to a reference point based on a traveling state of a vehicle. For example, as shown in FIGS. 12A, 12B, and 13A, in the case of turning left and turning right during forward movement, the expected guide line EL includes two guide lines which are displayed with a bumper outer end P1 and a rear inner tire outer end P2 as reference points, respectively. As shown in FIGS. 12C, 12D, and 13B, in the case of turning left and turning right during backward movement, the expected guide line EL includes two guide lines which are displayed with left and right rear tire outer ends P3 and P4 as reference points, respectively.

Figure 14A:
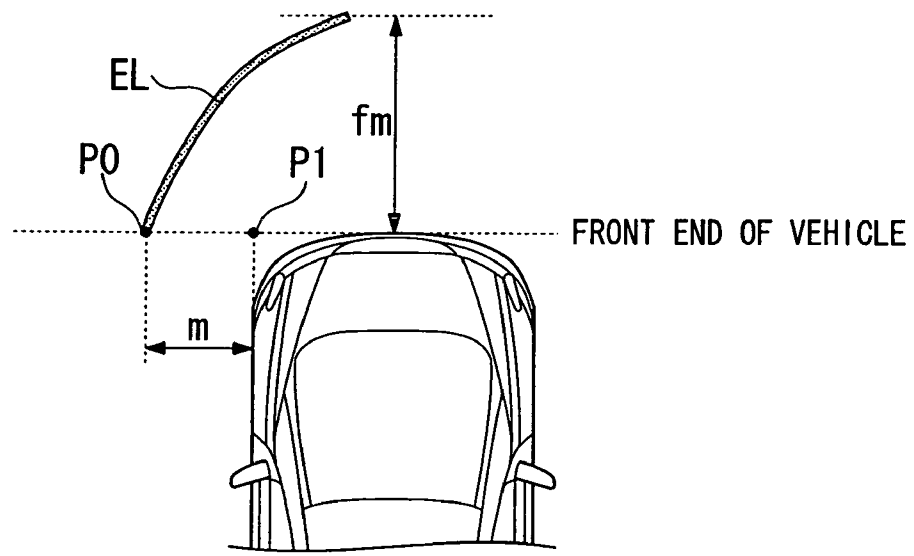
FIG. 14A is a diagram showing an example of an expected guide line EL superimposed on the image of the front view FV displayed on the display screen of the vehicle maneuver assistance device according to the embodiment of the invention.
Figure 14B:
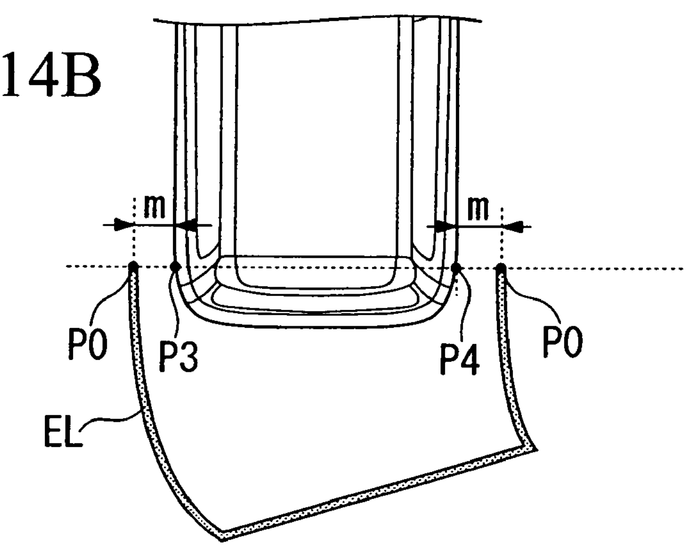
FIG. 14B is a diagram showing an example of an expected guide line EL superimposed on the image of the rear view RV displayed on the display screen of the vehicle maneuver assistance device according to the embodiment of the invention.
Figure 15A:
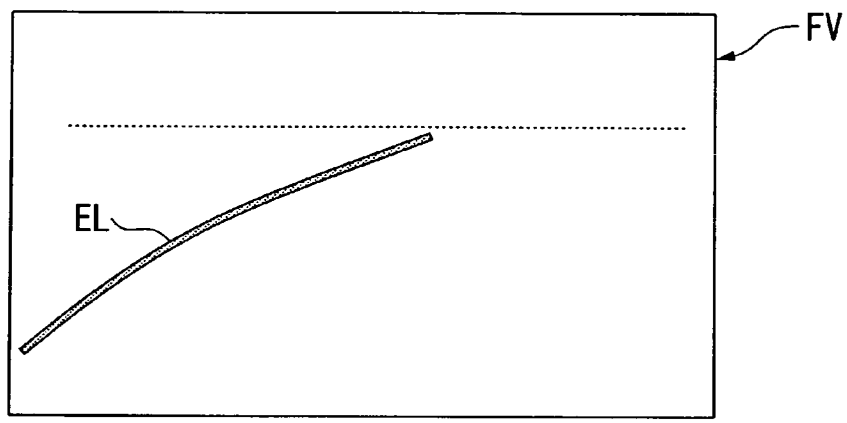
FIG. 15A is a diagram showing an example of an expected guide line EL superimposed on the image of the front view FV displayed on the display screen of the vehicle maneuver assistance device according to the embodiment of the invention.
Figure 15B:
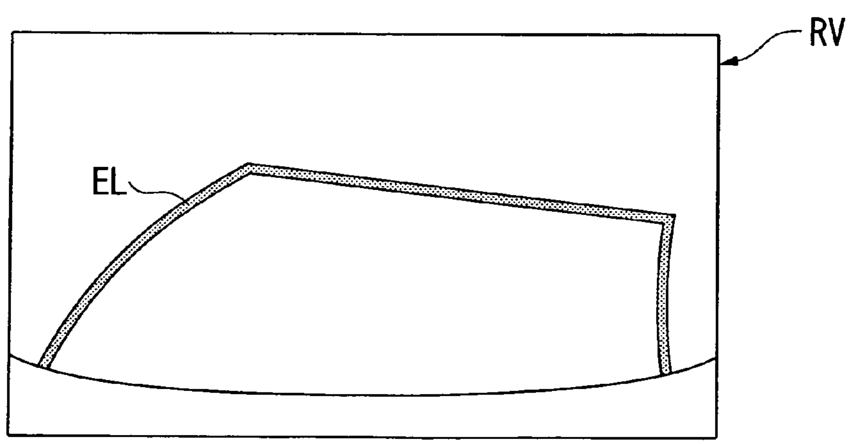
FIG. 15B is a diagram showing an example of an expected guide line EL superimposed on the image of the rear view RV displayed on the display screen of the vehicle maneuver assistance device according to the embodiment of the invention.

As shown in the FIGS. 14A and 15A, the expected guide line EL which is superimposed on the image of the front view FV includes one guide line which is displayed from the display start point P0 at a predetermined margin distance m with respect to the reference point of the bumper outer end P1 to a position at a predetermined distance fm forward from the front end of the vehicle. As shown in FIGS. 14B and 15B, the expected guide line EL which is superimposed on the image of the rear view RV is a frame-like guide line which is displayed from respective display start points P0 at a predetermined margin distance m with respect to the reference points of the left and right rear tire outer ends P3 and P4 to a position at a predetermined distance rearward from the rear end of the vehicle.

The indicator guide line DL is a guide line which is displayed at a position at a predetermined distance from the outer end (for example, a front end, a rear end, or a side end) of the vehicle, and is displayed in a display color different from the expected guide line EL.

The indicator guide line DL is not displayed when a parking operation described below is carried out (for example, at the time of backward movement while turning the steering wheel full left or right).

When a shift position is in a reverse position (when the vehicle is engaged in a reverse gear) and the vehicle is moving backward, if a steering angle detected by the steering angle sensor 32 or an actual steering angle based on the steering angle is equal to or larger than a predetermined value and the expected guide line EL is displayed, the indicator guide line DL is not displayed.

The display position of the indicator guide line DL is switched depending on a detection signal output from a shift position sensor 33, that is, whether or not a shift position is in a reverse position.

Figures 16A, 16B:
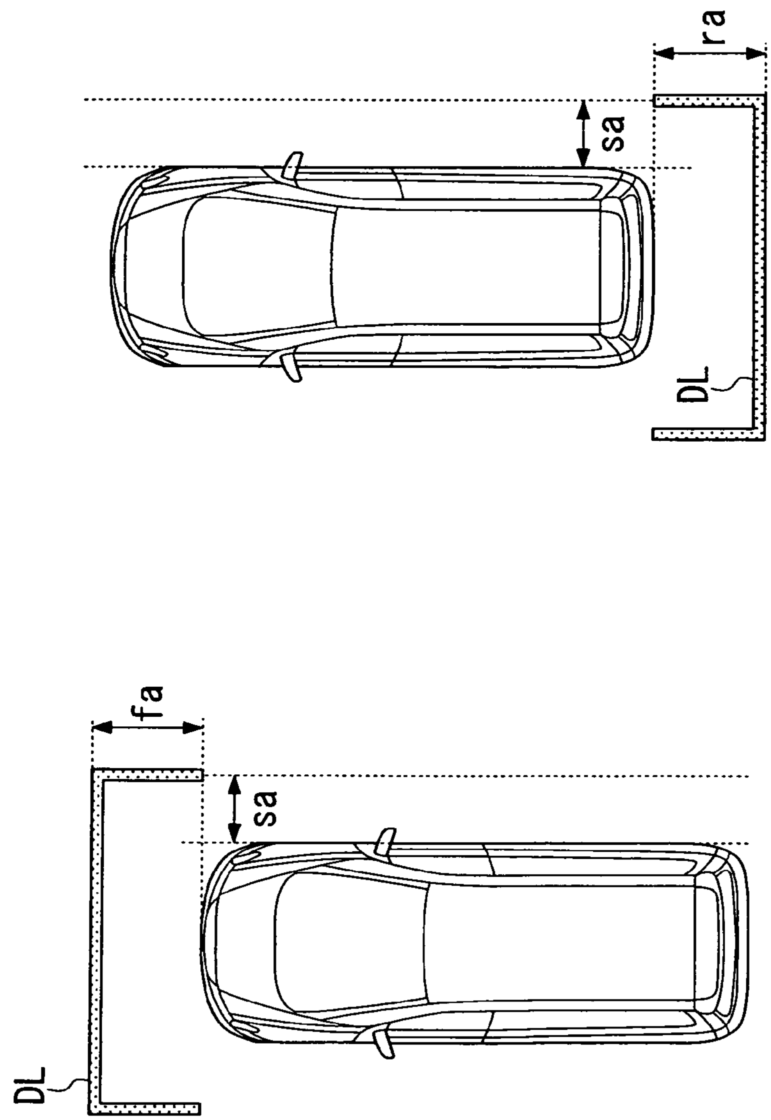
FIG. 16A is a diagram showing an example of an indicator guide line DL superimposed on the image of the ground view GV displayed on the display screen of the vehicle maneuver assistance device according to the embodiment of the invention.
FIG. 16B is a diagram showing an example of an indicator guide line DL superimposed on the image of the ground view GV displayed on the display screen of the vehicle maneuver assistance device according to the embodiment of the invention.

For example, when the shift position is in a position other than the reverse position (when the vehicle is engaged in a gear other than reverse), as shown in FIG. 16A, the indicator guide line DL which is superimposed on the image of the ground view GV is a frame-like guide line which is displayed at a position ahead of the vehicle at a predetermined distance fa from the front end of the vehicle and also at a predetermined distance sa from both side ends of the vehicle. When the shift position is in the reverse position, as shown in FIG. 16B, the indicator guide line DL which is superimposed on the image of the ground view GV is a frame-like guide line which is displayed at a position at the back of the vehicle at a predetermined distance ra from the rear end of the vehicle and also at a predetermined distance sa from both side ends of the vehicle.

Figure 17:
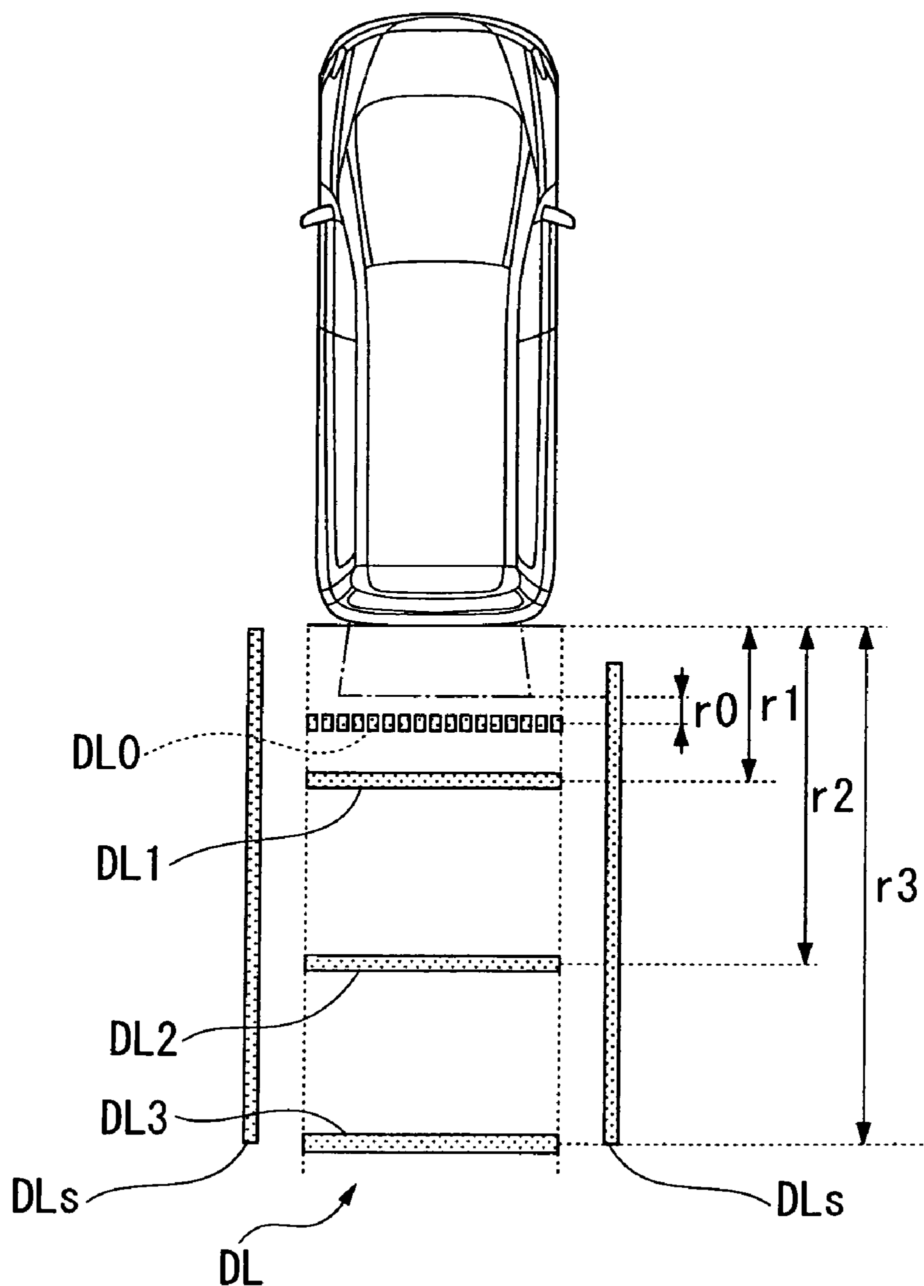
FIG. 17 is a diagram showing an example of an indicator guide line DL superimposed on the image of the rear view RV displayed on the display screen of the vehicle maneuver assistance device according to the embodiment of the invention.

As shown in FIG. 17, the indicator guide line DL which is superimposed on the image of the rear view RV includes a plurality of guide lines DL0 to DL3 of which lengths are approximately vehicle width and two guide lines DLs which extend rearward from the rear end of the vehicle. The guide line DL0 is displayed at a position at a predetermined distance r0 rearward from a rear end portion of the vehicle in a state where a backdoor or a tailgate of the vehicle is open. The guide lines DL1, DL2, and DL3 are displayed at positions at predetermined different distances r1, r2, and r3 rearward from the rear end of the vehicle, respectively. The guide lines DLs are displayed at positions at a predetermined distance sa from both side ends of the vehicle.

The indicator guide line DL is superimposed on the images of the left and right side views SV and the images of the left and right mirror views MV, in addition to the ground view GV, the front view FV, and the rear view RV.

The parking guide line PL is a guide line which assists driving at the time of the parking operation of the vehicle, and is superimposed on the image of the ground view GV. The parking guide line PL includes an initial positioning guide line PLA concerning the initial position of the vehicle when the parking operation starts, and a steering start positioning guide line PLB concerning the start position of a steering wheel operation from one direction to the other. The initial positioning guide line PLA and the steering start positioning guide line PLB are displayed in different display colors. The parking operation of the vehicle includes parallel parking and back-in parking.

Figure 18B:
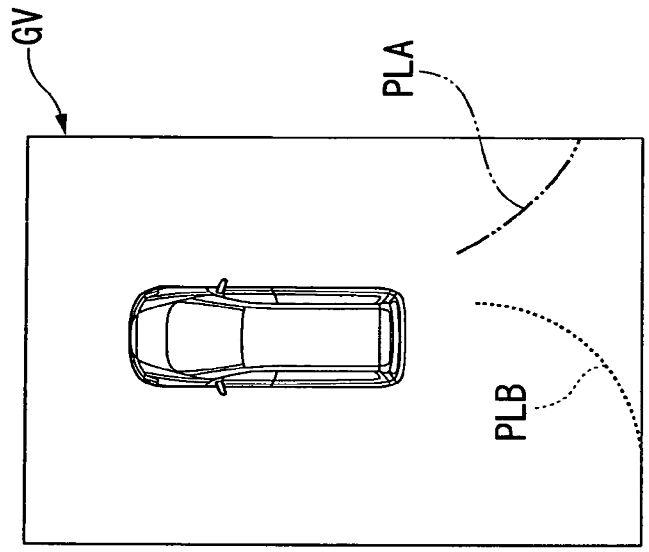
FIG. 18B is a diagram showing an example of an initial positioning guide line PLA and a steering start positioning guide line PLB for parallel parking superimposed on the image of the ground view GV displayed on the display screen of the vehicle maneuver assistance device according to the embodiment of the invention.
Figure 18A:
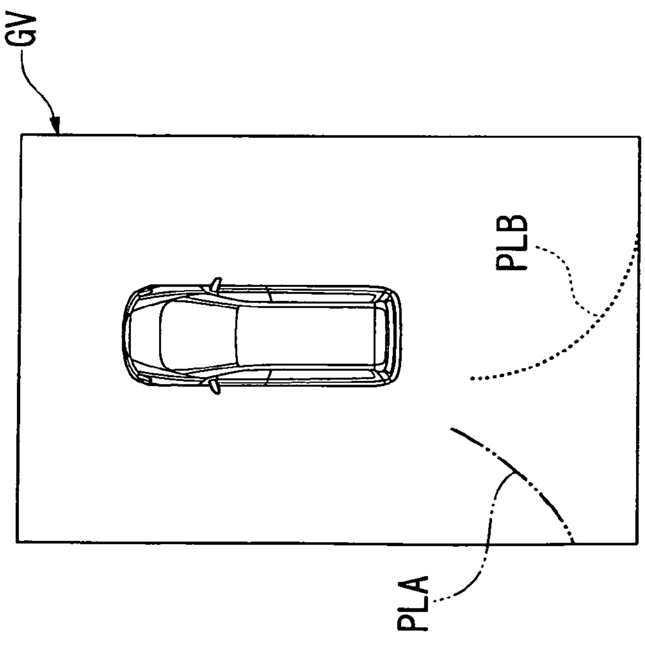
FIG. 18A is a diagram showing an example of an initial positioning guide line PLA and a steering start positioning guide line PLB for parallel parking superimposed on the image of the ground view GV displayed on the display screen of the vehicle maneuver assistance device according to the embodiment of the invention.

As shown in FIGS. 18A and 18B, when left/rightward parallel parking is carried out as the parking operation, the initial positioning guide line PLA of a predetermined line segment is displayed at a predetermined position on the left/right side at the back of the vehicle. Further, the steering start positioning guide line PLB is also displayed which is a part of the movement trajectory of a rear outer tire (or a position at a predetermined margin distance with respect to the rear outer tire) at the time of backward movement while turning the steering wheel full left or right (that is, the movement trajectory while turning the steering wheel full right associated with leftward parallel parking and the movement trajectory while turning the steering wheel full left associated with rightward parallel parking).

Figure 19A:
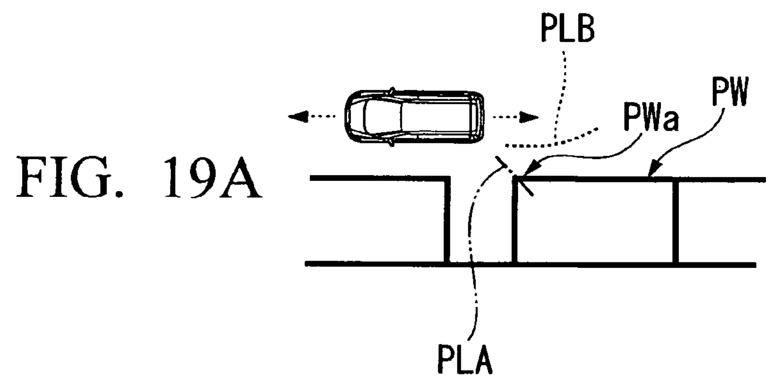
FIG. 19A is a diagram showing an example of an initial positioning guide line PLA and a steering start positioning guide line PLB for parallel parking superimposed on the image of the ground view GV displayed on the display screen of the vehicle maneuver assistance device according to the embodiment of the invention.

In the case of parallel parking, as shown in FIG. 19A, the initial positioning guide line PLA is a guide line which should be positioned so as to include a corner portion PWa closest to the vehicle from among corner portions of a predetermined rectangular parking frame PW. When the corner portion PWa of the parking frame PW which is closest to the vehicle is positioned on the initial positioning guide line PLA, the position of the vehicle becomes the initial position at the time of the parking operation for parallel parking.

Figure 19B:
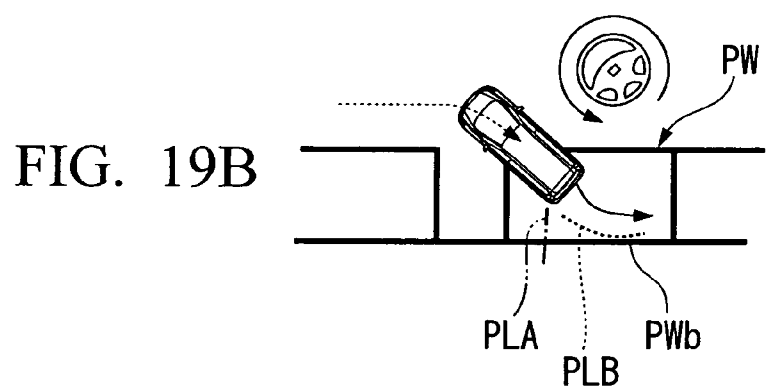
FIG. 19B is a diagram showing an example of an initial positioning guide line PLA and a steering start positioning guide line PLB for parallel parking superimposed on the image of the ground view GV displayed on the display screen of the vehicle maneuver assistance device according to the embodiment of the invention.

In the case of parallel parking, as shown in FIG. 19B, the steering start positioning guide line PLB is a guide line which should be positioned so as to be in contact with a long side PWb on the deeper side of a predetermined rectangular parking frame PW when the vehicle moves backward from the initial position while the steering wheel is turned full left or right (that is, while the steering wheel is turned full right for leftward parallel parking and while the steering wheel is turned full left for rightward parallel parking). When the steering start positioning guide line PLB is in contact with the long side PWb on the deeper side of the parking frame PW, the position of the vehicle represents the steering position for the steering wheel operation from one direction to the other at the time of the parking operation for parallel parking.

Figure 19C:
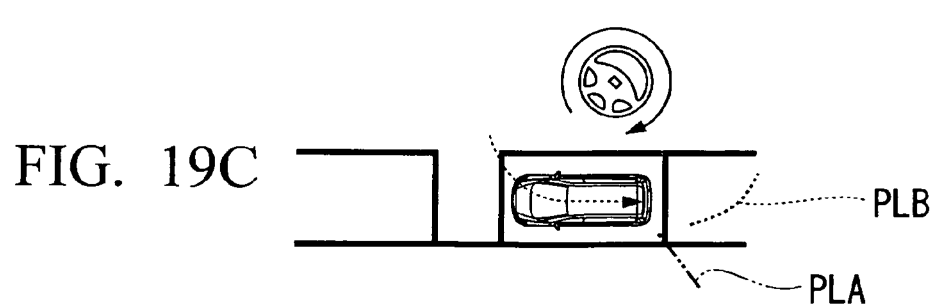
FIG. 19C is a diagram showing an example of an initial positioning guide line PLA and a steering start positioning guide line PLB for parallel parking superimposed on the image of the ground view GV displayed on the display screen of the vehicle maneuver assistance device according to the embodiment of the invention.

Accordingly, as shown in FIG. 19C, the vehicle moves backward from the steering position while the steering wheel is turned full left or right (that is, while the steering wheel is turned full right for leftward parallel parking and while the steering wheel is turned full left for rightward parallel parking) by the steering wheel operation and thereby is parked within the parking frame PW.

Figure 20B:
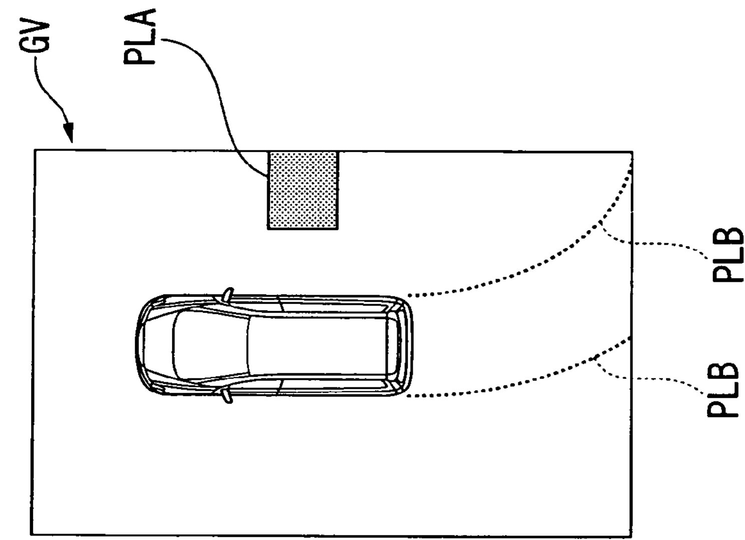
FIG. 20B is a diagram showing an example of an initial positioning guide line PLA and a steering start positioning guide line PLB for back-in parking superimposed on the image of the ground view GV displayed on the display screen of the vehicle maneuver assistance device according to the embodiment of the invention.
Figure 20A:
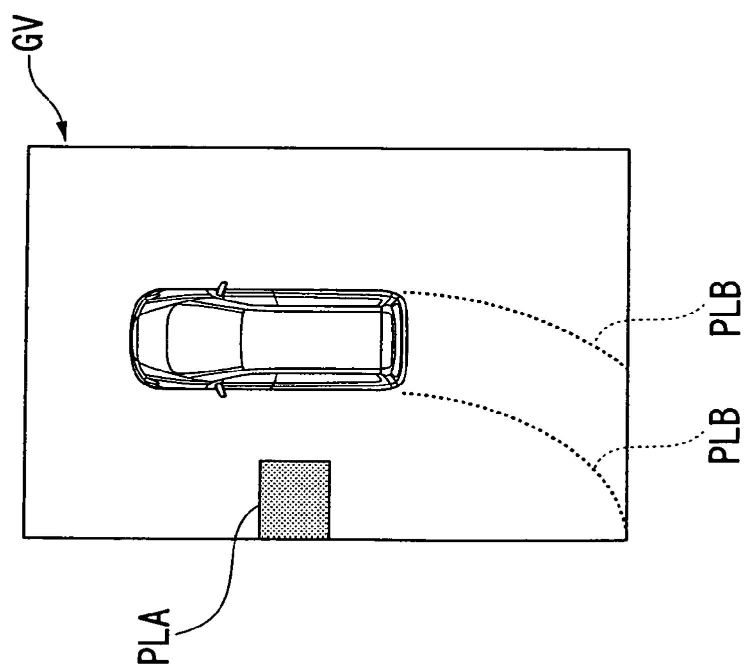
FIG. 20A is a diagram showing an example of an initial positioning guide line PLA and a steering start positioning guide line PLB for back-in parking superimposed on the image of the ground view GV displayed on the display screen of the vehicle maneuver assistance device according to the embodiment of the invention.

As shown in FIGS. 20A and 20B, when leftward/rightward back-in parking is carried out as the parking operation, a frame-like initial positioning guide line PLA is displayed at a predetermined position on the left/right side of the vehicle, and also steering start positioning guide lines PLB are displayed which are part of the movement trajectories of both rear wheels (or positions at a predetermined margin distance with respect to both rear wheels) at the time of backward movement while the steering wheel is turned full left or right (that is, the movement trajectory while the steering wheel is turned full left associated with leftward back-in parking and the movement trajectory while the steering wheel is turned full right associated with rightward back-in parking).

The inside of the frame-like initial positioning guide line PLA may be painted.

Figure 21A:
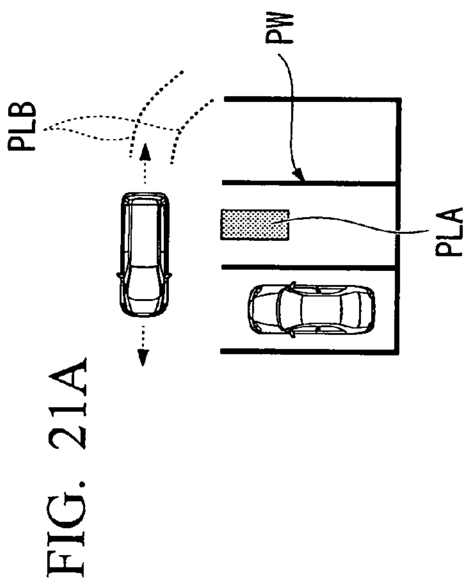
FIG. 21A is a diagram showing an example of an initial positioning guide line PLA and a steering start positioning guide line PLB for back-in parking superimposed on the image of the ground view GV displayed on the display screen of the vehicle maneuver assistance device according to the embodiment of the invention.

In the case of back-in parking, as shown in FIG. 21A, the initial positioning guide line PLA is a guide line which should be positioned so as to be substantially disposed at the center of a rectangular parking frame PW. When the initial positioning guide line PLA is substantially disposed at the center of the parking frame PW, the position of the vehicle represents the initial position at the time of the parking operation for back-in parking.

Figure 21B:
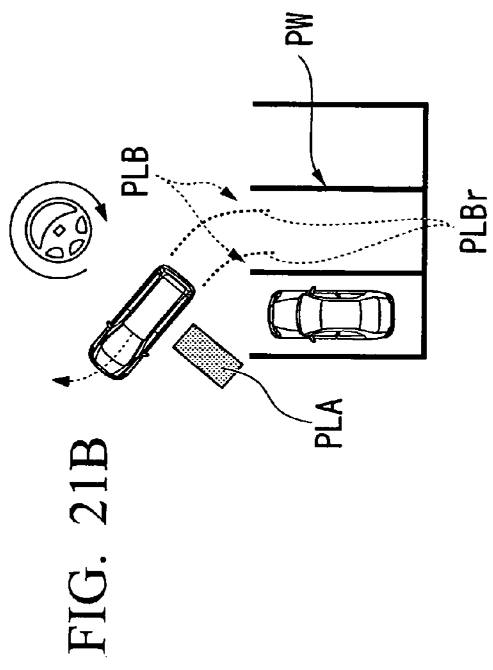
FIG. 21B is a diagram showing an example of an initial positioning guide line PLA and a steering start positioning guide line PLB for back-in parking superimposed on the image of the ground view GV displayed on the display screen of the vehicle maneuver assistance device according to the embodiment of the invention.

In the case of back-in parking, as shown in FIG. 21B, the steering start positioning guide lines PLB are guide lines which should be positioned such that the rear end positions PLBr of the steering start positioning guide lines PLB are disposed within the rectangular parking frame PW when the vehicle moves forward from the initial position while the steering wheel is turned full left or right (that is, while the steering wheel is turned full right for leftward back-in parking and while the steering wheel is turned full left for rightward back-in parking). When the rear end positions PLBr of the steering start positioning guide lines PLB are disposed within the parking frame PW, the position of the vehicle represents the steering position at the time of the parking operation for back-in parking.

Figure 21C:
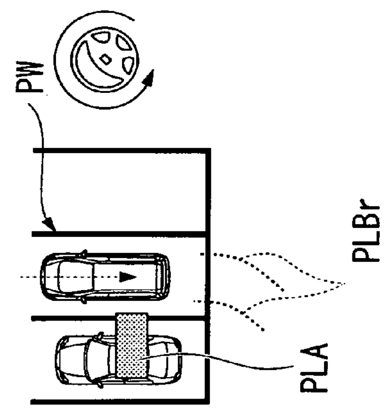
FIG. 21C is a diagram showing an example of an initial positioning guide line PLA and a steering start positioning guide line PLB for back-in parking superimposed on the image of the ground view GV displayed on the display screen of the vehicle maneuver assistance device according to the embodiment of the invention.

Accordingly, as shown in FIG. 21C, the vehicle moves backward from the steering position while the steering wheel is turned full left or right (that is, while the steering wheel is turned full right for leftward back-in parking and while the steering wheel is turned full left for rightward back-in parking) by the steering operation and is parked within the parking frame PW.

In the respective parking operations, the initial positioning guide line PLA is constantly superimposed on the image of the ground view GV. Further, the steering start positioning guide line PLB is superimposed on the image of the ground view GV when a steering angle in a predetermined direction detected by the steering angle sensor 32 or an actual steering angle based on the steering angle is equal to or larger than a predetermined value around the angle while the steering wheel is turned full left or right.

Figure 22A:
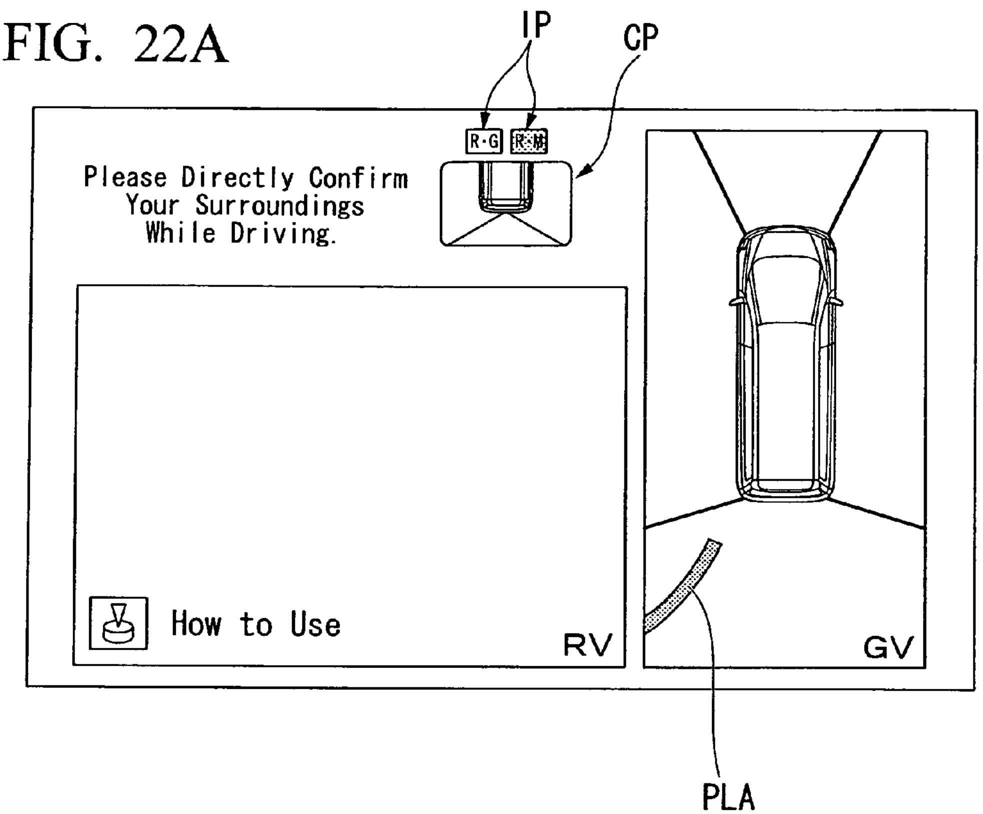
FIG. 22A is a diagram showing an example of an initial positioning guide line PLA for parallel parking superimposed on the image of the ground view GV displayed on the display screen of the vehicle maneuver assistance device according to the embodiment of the invention.
Figure 22B:
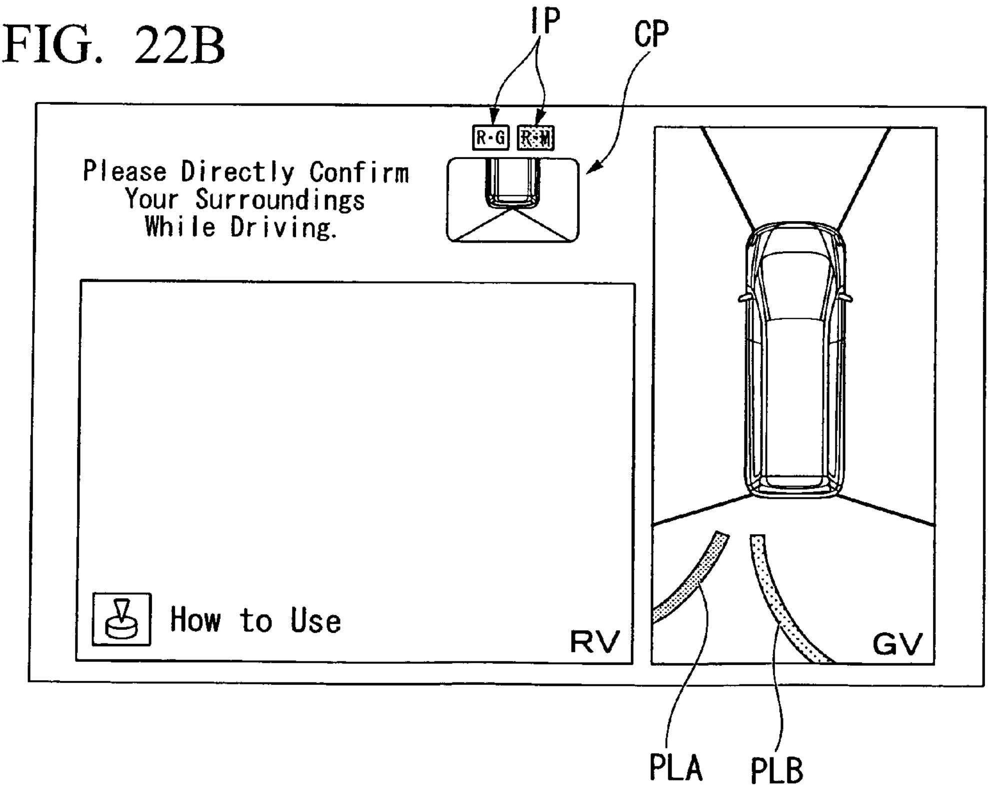
FIG. 22B is a diagram showing an example of an initial positioning guide line PLA and a steering start positioning guide line PLB for parallel parking superimposed on the image of the ground view GV displayed on the display screen of the vehicle maneuver assistance device according to the embodiment of the invention.

For example, like the image of the ground view GV for leftward parallel parking shown in FIGS. 22A and 22B, while the shift position is in the reverse position at the initial position of the vehicle during the parking operation (shown in FIG. 22A), if the steering wheel is turned left and a steering angle or an actual steering angle based on the steering angle is equal to or larger than a predetermined value around the angle while the steering wheel is turned full left (shown in FIG. 22B), the steering start positioning guide line PLB is superimposed on the image of the ground view GV.

Figure 23A:
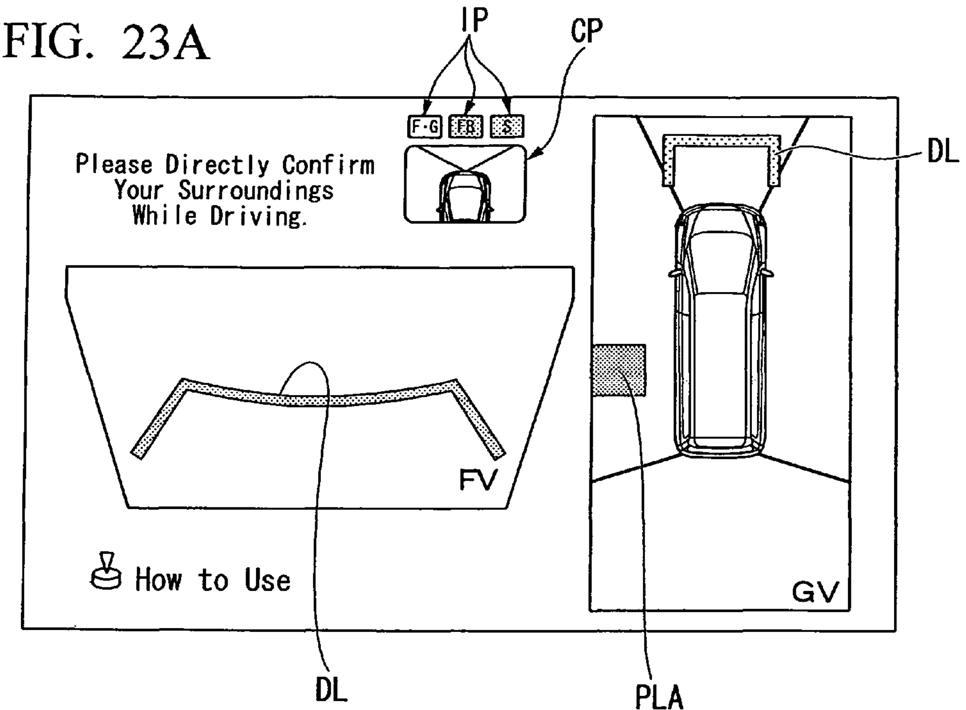
FIG. 23A is a diagram showing an example of an initial positioning guide line PLA for back-in parking superimposed on the image of the ground view GV displayed on the display screen of the vehicle maneuver assistance device according to the embodiment of the invention.
Figure 23B:
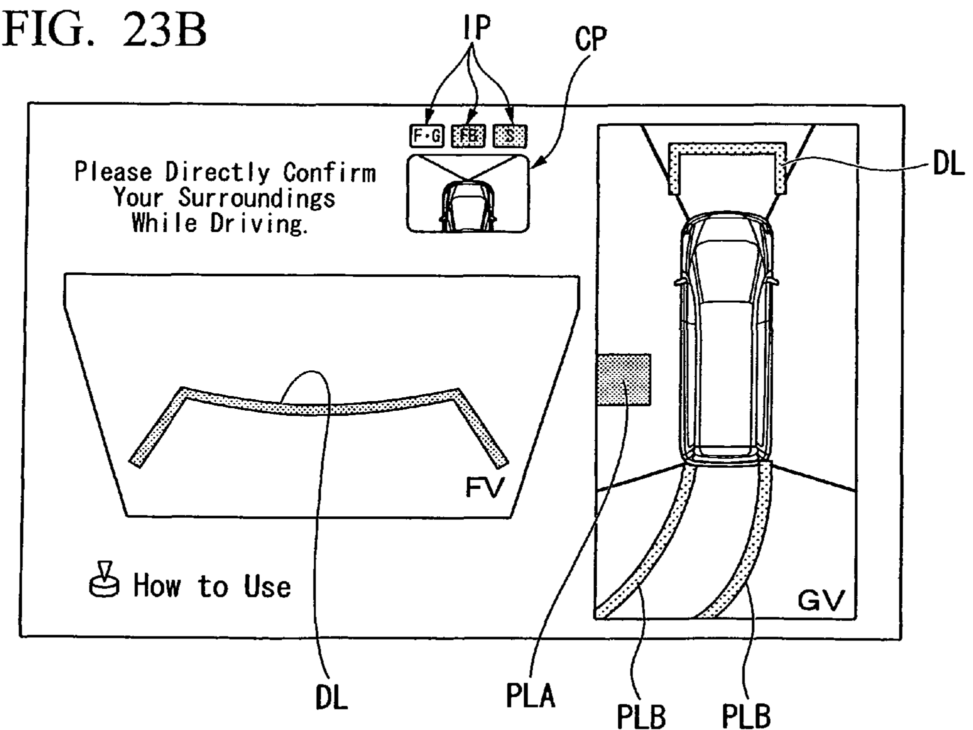
FIG. 23B is a diagram showing an example of an initial positioning guide line PLA and a steering start positioning guide line PLB for back-in parking superimposed on the image of the ground view GV displayed on the display screen of the vehicle maneuver assistance device according to the embodiment of the invention.

Like the image of the ground view GV for leftward back-in parking shown in FIGS. 23A and 23B, while the shift position is in a position other than the reverse position at the initial position of the vehicle during the parking operation (shown in FIG. 23A), if the steering wheel is turned right and a steering angle or an actual steering angle based on the steering angle is equal to or larger than a predetermined value around the angle while the steering wheel is turned full right (shown in FIG. 23B), the steering start positioning guide line PLB is superimposed on the image of the ground view GV.

The steering start positioning guide line PLB which is superimposed on the image of the ground view GV is continued to be displayed until the parking operation is completed.

The display control unit 45 switches the presence/absence of guide display and the display contents in accordance with the command signal output from the operating switch 15.

Figure 24:
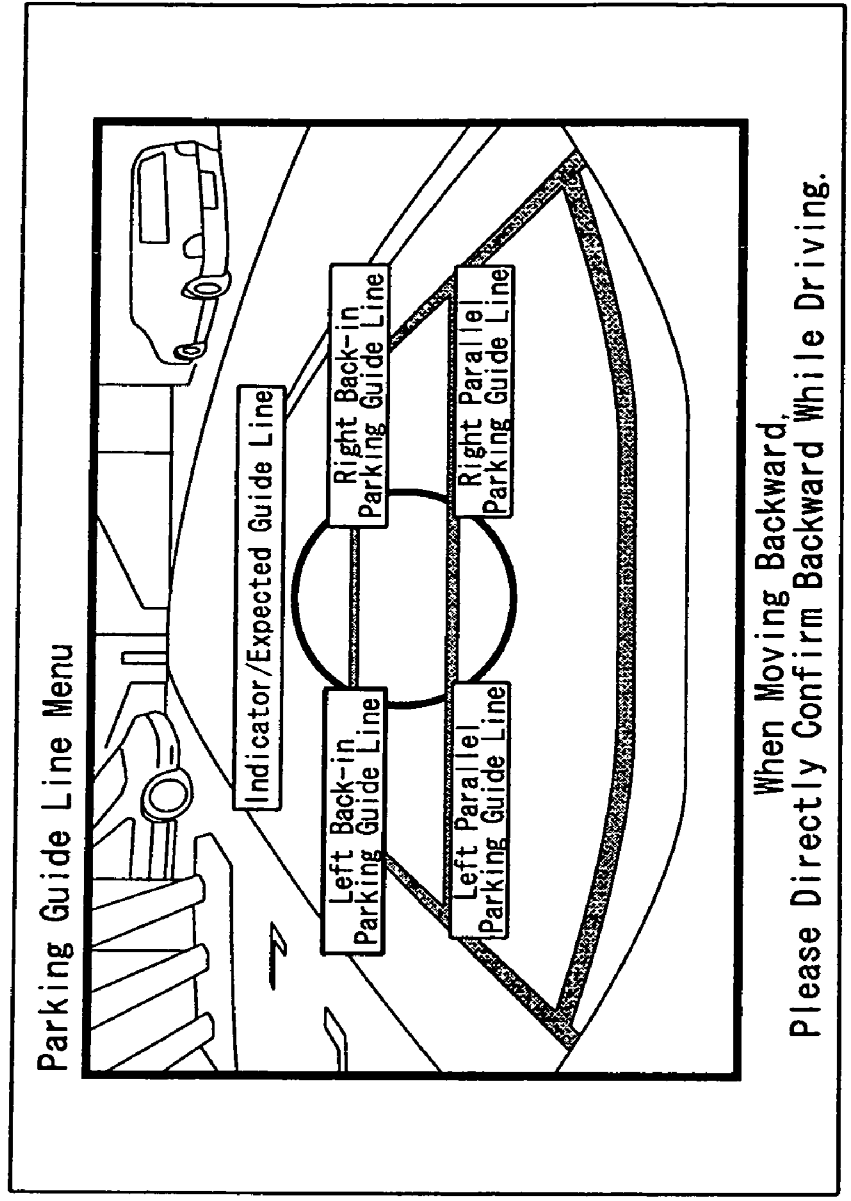
FIG. 24 is a diagram showing an example of a parking guide line menu displayed on the display screen of the vehicle maneuver assistance device according to the embodiment of the invention.

As shown in FIG. 9A, when the image of the ground view GV is displayed on the display screen of the display device 19 as a normal operation (that is, when various kinds of guide displays are not superimposed on the image of the ground view GV), the display control unit 45 displays an indication image PP (parking menu) on the display screen by a predetermined operation (for example, a rotation operation) of the operating switch 15. The indication image PP indicates that a predetermined parking guide line menu can be displayed. If the operator operates (for example, rotates) the operating switch 15, a predetermined parking guide line menu shown in FIG. 24 is displayed on the display screen.

The parking guide line menu includes, for example, a selection menu (indicator/expected guide line) which indicates display of the expected guide line EL and the indicator guide line DL, and respective selection menus (left back-in parking guide line, right back-in parking guide line, left parallel parking guide line, or right parallel parking guide line) which indicate display of the parking guide lines PL with regard to leftward/rightward parallel parking or leftward/rightward back-in parking.

While the parking guide line menu is displayed on the display screen, the respective selection menus can be selected and the respective guide lines corresponding to the selection menus can be displayed by a predetermined operation (for example, a rotation operation and a push operation) of the operating switch 15.

Figure 25A:
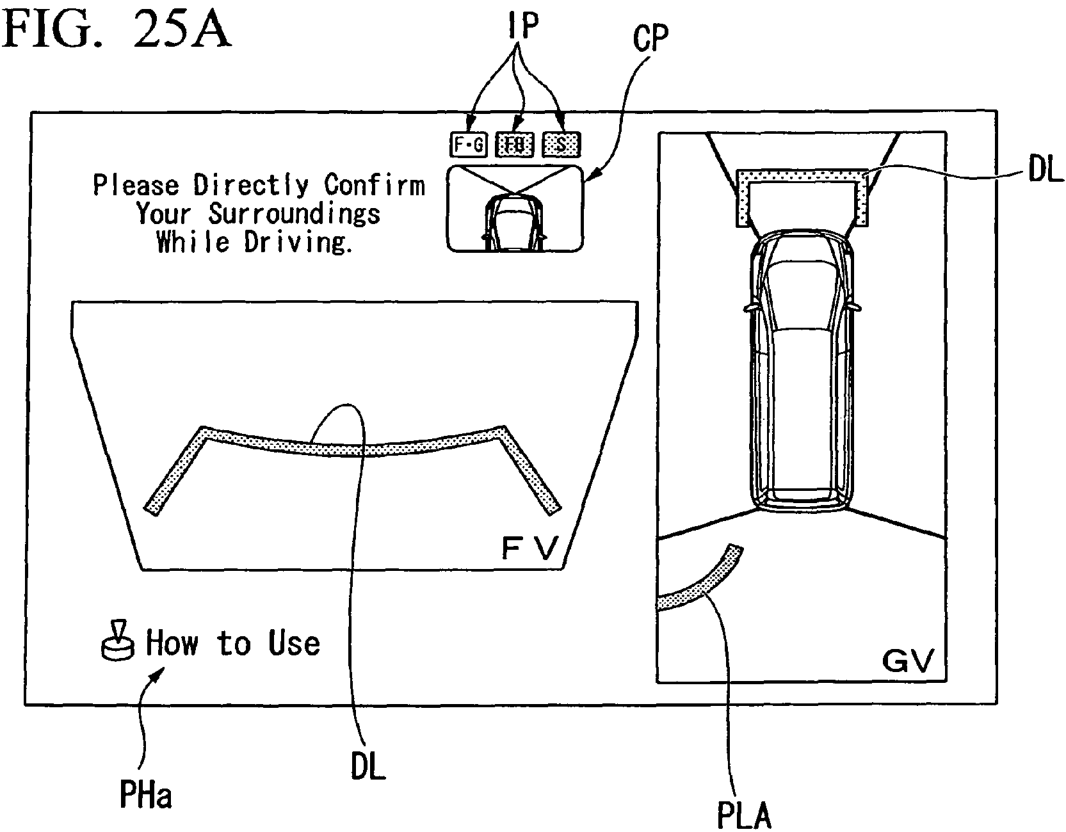
FIG. 25A is a diagram showing an example of an initial positioning guide line PLA and a steering start positioning guide line PLB for parallel parking superimposed on the image of the ground view GV displayed on the display screen of the vehicle maneuver assistance device according to the embodiment of the invention.

While a parking guide line menu (for example, a parking guide line menu shown in FIG. 24) which is switched from a display mode of the combination of the front view FV and the ground view GV in the normal operation is displayed on the display screen, a selection menu (left parallel parking guide line) which indicates display of the parking guide line PL with regard to leftward parallel parking is selected by a predetermined operation of the operating switch 15. With this operation, as shown in FIG. 25A, the display screen is switched to a display mode of the combination of the front view FV and the ground view GV. In this case, if a steering angle or an actual steering angle based on the steering angle is smaller than a predetermined value and the shift position is in a position other than the reverse position, the indicator guide line DL is superimposed on the image of the front view FV, and the indicator guide line DL and the initial positioning guide line PLA are superimposed on the image of the ground view GV. On the display screen, an indication image PHa (How to Use) which indicates displaying a help display for how to use the parking guide line PL is also displayed by a predetermined operation (for example, a push operation) of the operating switch 15.

Figure 26A:
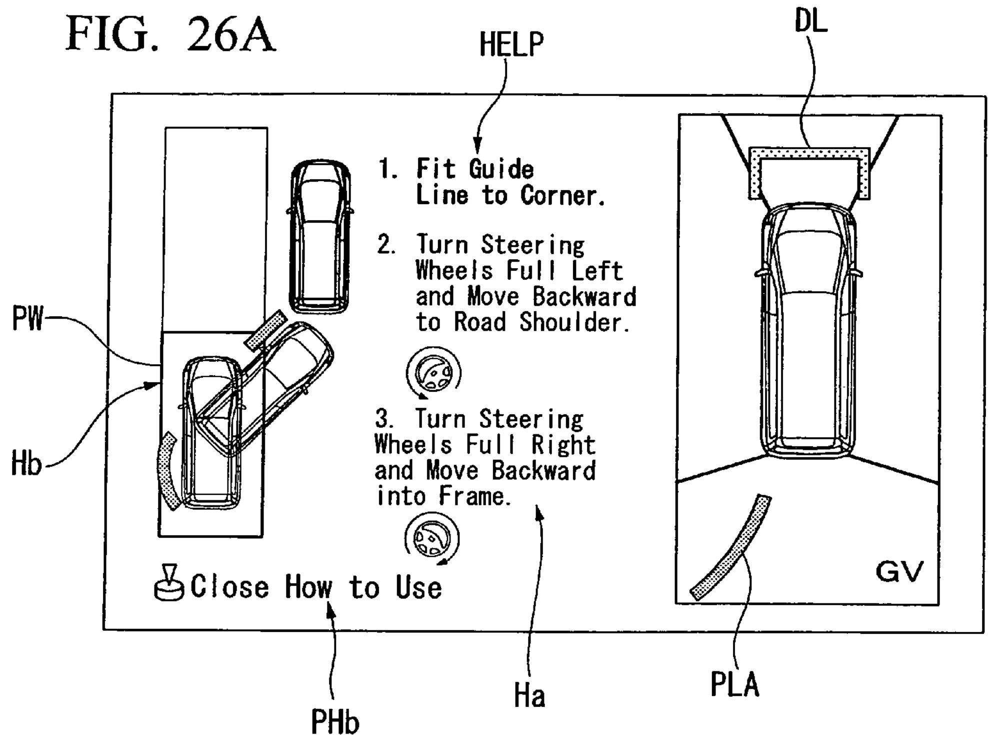
FIG. 26A is a diagram showing a help display HELP displayed together with the image of the ground view GV on the display screen of the vehicle maneuver assistance device according to the embodiment of the invention.

If the operator operates (for example, pushes) the operating switch 15, a predetermined help display HELP shown in FIG. 26A is displayed on the display screen together with the image of the ground view GV.

At this time, the help display HELP may be displayed at a position which does not interfere with the ground view GV.

In this case, on the display screen, an indication image PHb (Close How to Use) which indicates hiding the help display HELP is also displayed by a predetermined operation (for example, a push operation) of the operating switch 15 to indicate that display of the help display HELP can be ended.

The help display HELP includes, for example, instruction messages Ha for a plurality of operation steps (for example, "1. Fit Guide Line to Corner.", "2. Turn Steering Wheels Full Left and Move Backward to Road Shoulder.", "3. Turn Steering Wheels Full Right and Move Backward into Frame.", and the like), and schematic images Hb corresponding to the instruction messages Ha. The instruction messages Ha constitute a series of driving operations when the parking operation for leftward parallel parking or the like is carried out. The schematic images Hb schematically show the positional relationship between the parking frame PW, the vehicle, and the parking guide lines PL corresponding to the instruction messages Ha. The instruction images Ha and the schematic images Hb are sequentially highlighted in accordance with the actual vehicle state (for example, a shift position detected by the shift position sensor 33 and the degree of a steering angle detected by the steering angle sensor 32 or an actual steering angle based on the steering angle) when the parking operation is carried out, that is, a plurality of operation steps constituting a series of driving operations when the parking operation is carried out. Highlighting may be performed, for example, by increasing contrast or display size, or by changing the display color.

For a plurality of operation steps constituting a series of driving operations when the parking operation is carried out, the corresponding instruction message Ha and schematic image Hb are displayed in the same color. The instruction messages Ha and the schematic images Hb are displayed in different colors between a plurality of operation steps.

Figure 25B:
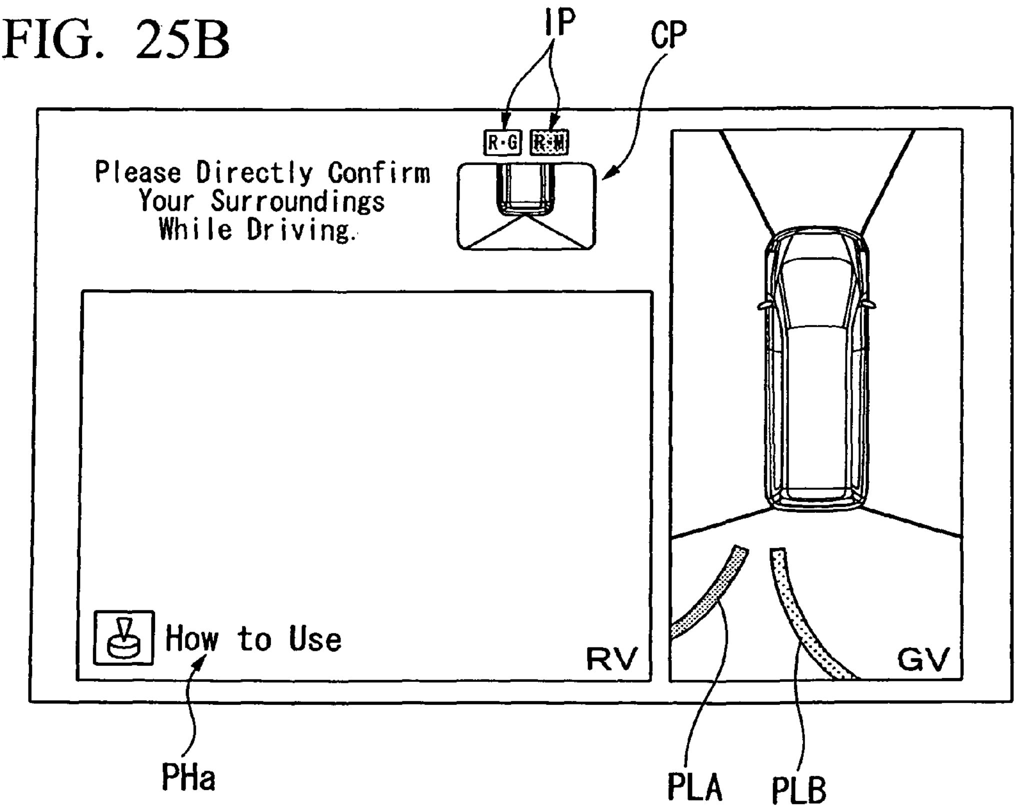
FIG. 25B is a diagram showing an example of an initial positioning guide line PLA and a steering start positioning guide line PLB for parallel parking superimposed on the image of the ground view GV displayed on the display screen of the vehicle maneuver assistance device according to the embodiment of the invention.
Figure 26B:
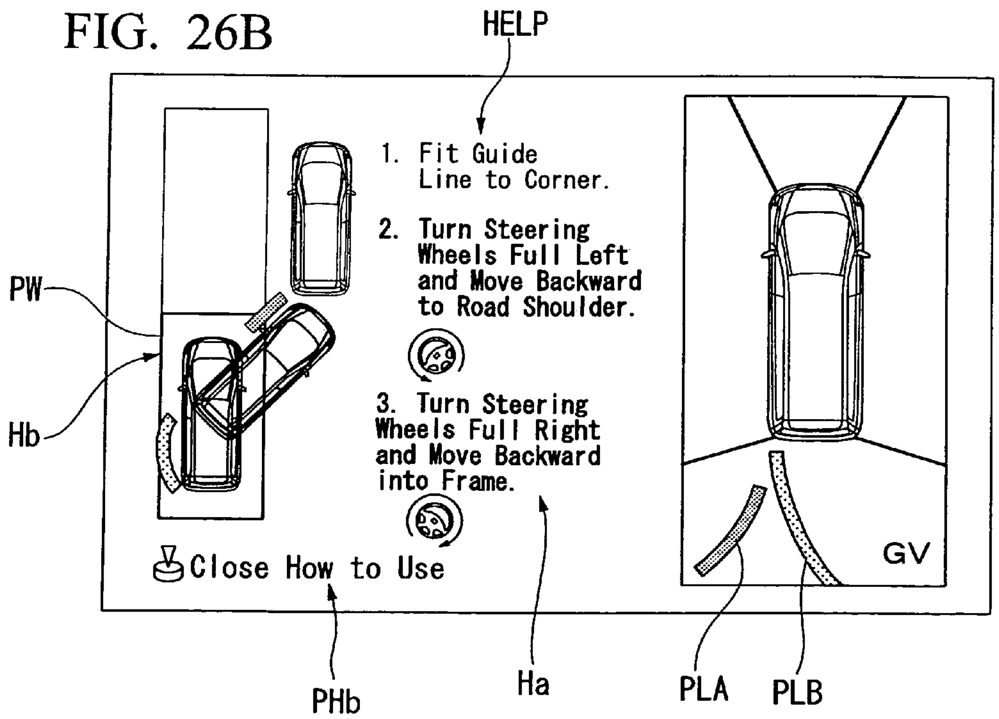
FIG. 26B is a diagram showing a help display HELP displayed together with the image of the ground view GV on the display screen of the vehicle maneuver assistance device according to the embodiment of the invention.

On a display screen shown in FIG. 25A or 26A, when the parking operation for leftward parallel parking is carried out, the shift position is in a position other than the reverse position. In this state, since a steering angle or an actual steering angle based on the steering angle is smaller than a predetermined value, only the initial positioning guide line PLA is superimposed on the image of the ground view GV. In the help display HELP, only an instruction message Ha ("1. Fit Guide Line to Corner."), which gives instructions for setting the vehicle at the initial position during the parking operation, and a schematic image Hb corresponding to the instruction message Ha are highlighted. In this state, the shift position is set in the reverse position at the initial position of the vehicle during the parking operation for leftward parallel parking, and the steering wheel is turned left such that a steering angle or an actual steering angle based on the steering angle is equal to or larger than a predetermined value around the angle while the steering wheel is turned full left. In this case, like a display screen shown in FIG. 25B or 26B, the initial positioning guide line PLA and the steering start positioning guide line PLB are superimposed on the image of the ground view GV in a display mode of the combination of the rear view RV and the ground view GV. In the help display HELP, only instruction messages Ha ("2. Turn Steering Wheels Full Left and Move Backward to Road Shoulder.", "3. Turn Steering Wheels Full Right and Move Backward into Frame."), which give instructions for moving the vehicle backward from the initial position while the steering wheel is turned full left or right and then for moving the vehicle backward from the steering position while the steering wheel is turned full right or left, respectively, and schematic images Hb corresponding to the instruction messages Ha are highlighted.

Figure 27A:
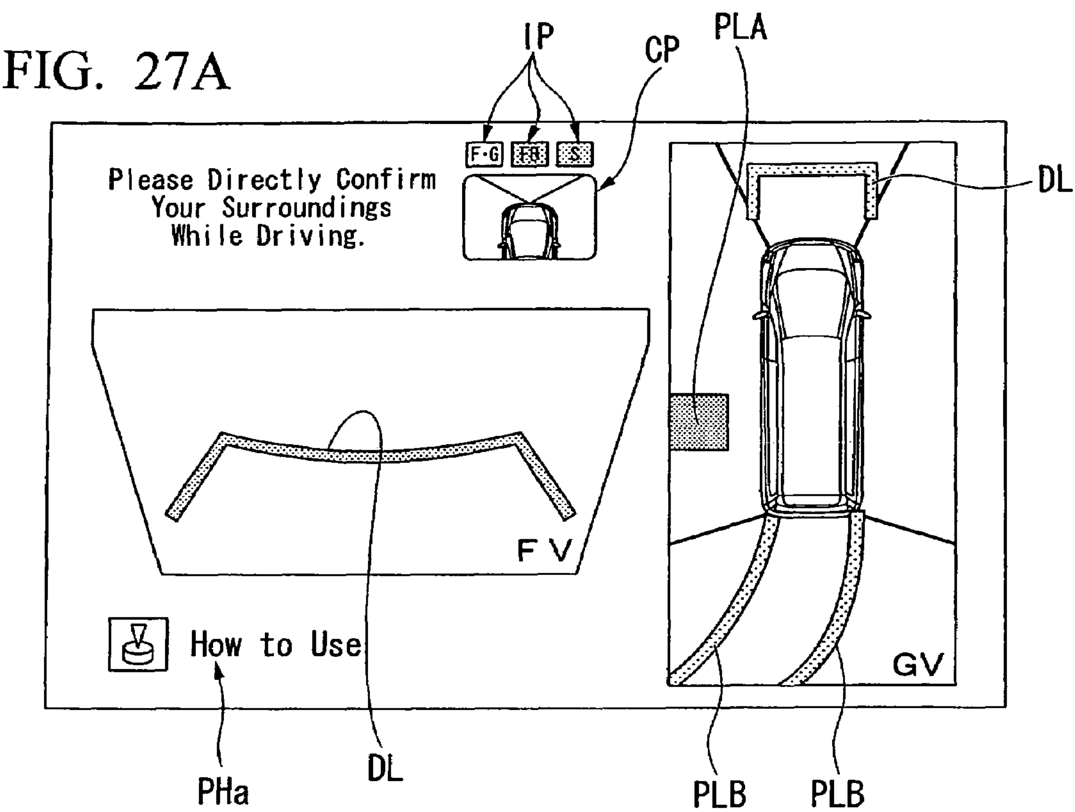
FIG. 27A is a diagram showing an example of an initial positioning guide line PLA and a steering start positioning guide line PLB for back-in parking superimposed on the image of the ground view GV displayed on the display screen of the vehicle maneuver assistance device according to the embodiment of the invention.

While a parking guide line menu (for example, a parking guide line menu shown in FIG. 24) which is switched from a display mode of the combination of the front view FV and the ground view GV in the normal operation is displayed on the display screen, a selection menu (left back-in parking guide line) which indicates display of the parking guide line PL with regard to leftward back-in parking is selected by a predetermined operation of the operating switch 15. With this operation, as shown in FIG. 27A, the display screen is switched to a display mode of the combination of the front view FV and the ground view GV.

In this case, if a steering angle or an actual steering angle based on the steering angle is greater than a predetermined value and the shift position is in a position other than the reverse position, the indicator guide line DL is superimposed on the image of the front view FV, and the indicator guide line DL, the initial positioning guide line PLA, and the steering start positioning guide line PLB are superimposed on the image of the ground view GV. On the display screen, an indication image PHa (How to Use) which indicates displaying a help display for how to use the parking guide line PL is also displayed by a predetermined operation (for example, a push operation) of the operating switch 15.

Figure 28A:
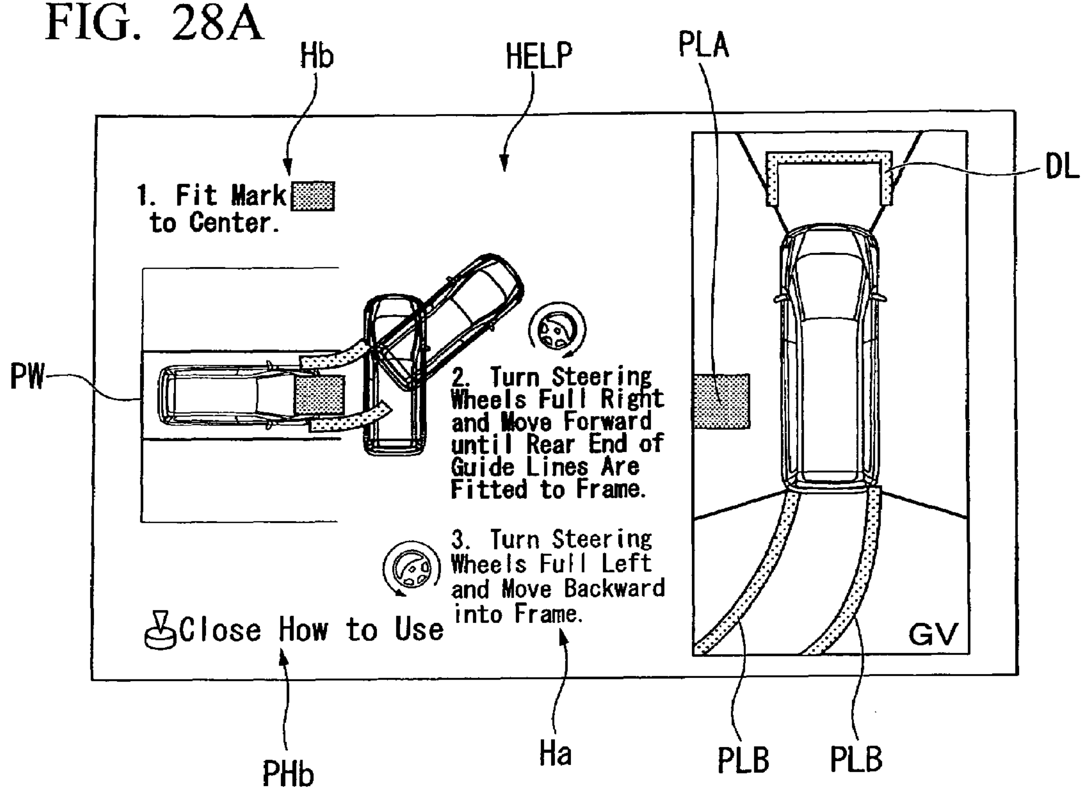
FIG. 28A is a diagram showing a help display HELP displayed together with the image of the ground view GV on the display screen of the vehicle maneuver assistance device according to the embodiment of the invention.

If the operator operates (for example, pushes) the operating switch 15, a predetermined help display HELP shown in FIG. 28A is displayed on the display screen together with the image of the ground view GV. In this case, on the display screen, an indication image PHb (Close How to Use) which indicates hiding the help display HELP is also displayed by a predetermined operation (for example, a push operation) of the operating switch 15 to indicate that display of the help display HELP can be ended.

The help display HELP includes, for example, instruction messages Ha for a plurality of operation steps (for example, "1. Fit Mark to Center (of the initial positioning guide line PLA).", "2. Turn Steering Wheels Full Right and Move Forward until Rear End of Guide Lines Are Fitted to Frame.", "3. Turn Steering Wheels Full Left and Move Backward into Frame.", and the like), and schematic images Hb corresponding to the instruction messages Ha. The instruction messages Ha constitute a series of driving operations when the parking operation for leftward back-in parking or the like is carried out. The schematic images Hb schematically show the positional relationship between the parking frame PW, the vehicle, and the parking guide lines PL corresponding to the instruction messages Ha. The instruction images Ha and the schematic images Hb are sequentially highlighted in accordance with the actual vehicle state (for example, a shift position detected by the shift position sensor 33 and the degree of a steering angle detected by the steering angle sensor 32 or an actual steering angle based on the steering angle) when the parking operation is carried out, that is, a plurality of operation steps constituting a series of driving operations when the parking operation is carried out. Highlighting may be performed, for example, by increasing contrast or display size, or by changing the display color.

Figure 27B:
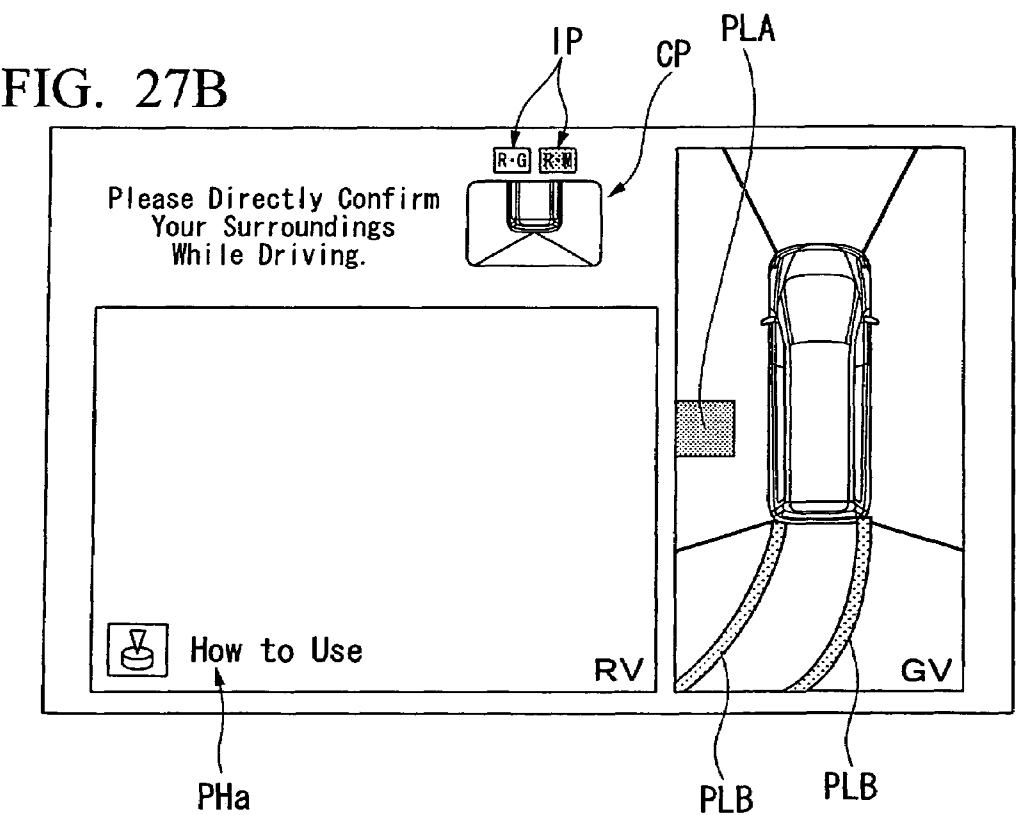
FIG. 27B is a diagram showing an example of an initial positioning guide line PLA and a steering start positioning guide line PLB for back-in parking superimposed on the image of the ground view GV displayed on the display screen of the vehicle maneuver assistance device according to the embodiment of the invention.
Figure 28B:
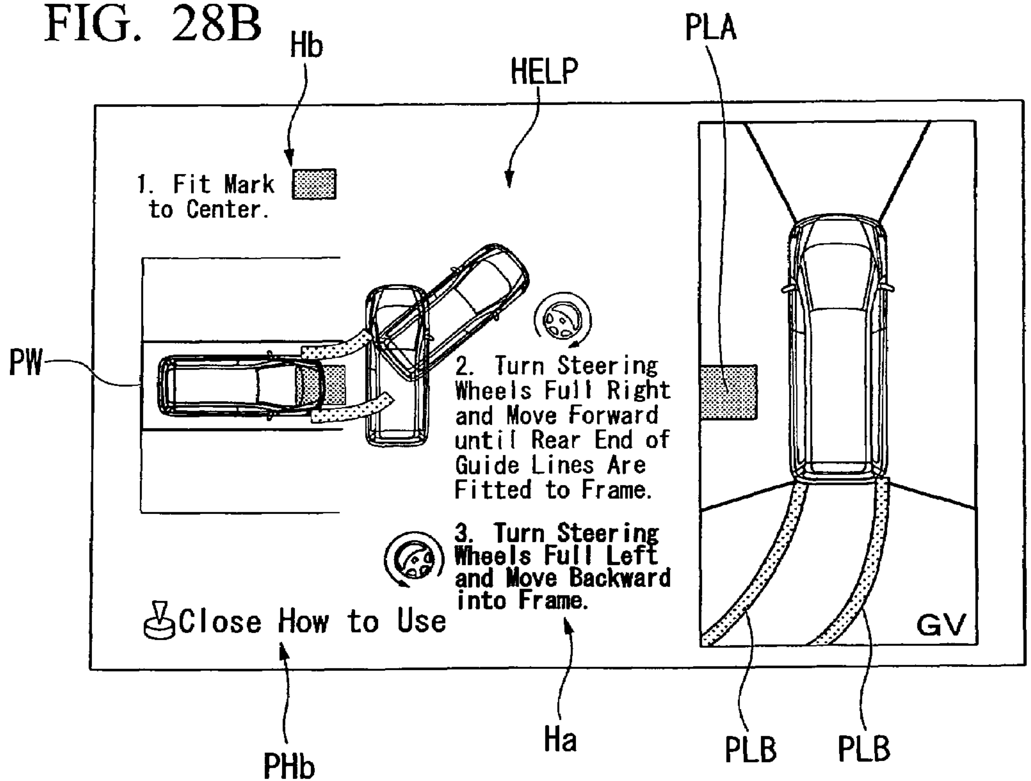
FIG. 28B is a diagram showing a help display HELP displayed together with the image of the ground view GV on the display screen of the vehicle maneuver assistance device according to the embodiment of the invention.

On a display screen shown in FIG. 27A or 28A, when the parking operation for leftward back-in parking is carried out, the shift position is in a position other than the reverse position. In this state, since a steering angle or an actual steering angle based on the steering angle is smaller than a predetermined value, the indicator guide line DL, the initial positioning guide line PLA, and the steering start positioning guide line PLB is superimposed on the image of the ground view GV. In the help display HELP, only an instruction messages Ha ("1. Fit Mark to Center (of the initial positioning guide line PLA).", and "2. Turn Steering Wheels Full Right and Move Forward until Rear End of Guide Lines Are Fitted to Frame."), which gives instructions for setting the vehicle at the initial position during the parking operation, and then for setting the vehicle at the steering position by moving the vehicle backward from initial position while the steering wheel is turned full left or right, and a schematic image Hb corresponding to the instruction messages Ha are highlighted. In this state, the shift position is set in the reverse position at the steering position of the vehicle during the parking operation for leftward back-in parking, and the steering wheel is turned left such that a steering angle or an actual steering angle based on the steering angle is equal to or larger than a predetermined value around the angle while the steering wheel is turned full left. In this case, like a display screen shown in FIG. 27B or 28B, the initial positioning guide line PLA and the steering start positioning guide line PLB are superimposed on the image of the ground view GV in a display mode of the combination of the rear view RV and the ground view GV. In the help display HELP, only instruction message Ha ("3. Turn Steering Wheels Full Left and Move Backward into Frame."), which give instructions for moving the vehicle backward from the steering position while the steering wheel is turned full right or left, that is, to the opposite direction, and schematic images Hb corresponding to the instruction message Ha are highlighted.

As above-described, according to the vehicle maneuver assistance device 10 of the embodiment, the parking guide lines PL are displayed by superimposing them on the image of the ground view GV. Therefore, the driver can easily perform visual reorganization of the relative positions between the parking frame PW and parking guide lines PL, even when the vehicle had moved.

Moreover, the initial positioning guide line PLA and the steering start positioning guide line PLB, which constitutes the parking guide lines PL, are predetermined line segment. Therefore the operation steps can be performed easily; thereby convenience of the driver can be improved.

The operation required to be performed by the driver in the parallel parking is to position the initial positioning guide line PLA at the corner portion PWa closest to the vehicle. For example, as compared to the case in which it is required to position the initial positioning guide line PLA at the corner portion PWa other than the one closest to the vehicle, the driver can more easily recognize the required operation. Moreover, the target corner portion PWa can be visually recognized more easily. Therefore, the driving operation can be more easily performed, thereby improving convenience of the driver.

Further, the operation required to be performed by the driver is to position the initial positioning guide line PLA at essentially center position of the rectangular parking frame PW. In this case, as compared to, for example, in the case where the PLA needs to be positioned at a marker set at a predetermined position, the driving operation can be more easily performed, thereby improving convenience of the driver.

As explained above, in the vehicle surroundings monitoring apparatus according to the present embodiment, the display of the indicator guide line DL and the expected guide line EL are prohibited. Therefore, even in a case where a parking operation is started in a state the display of the indicator guide line DL and the expected guide line EL is allowed by the driver, the display of the indicator guide line DL and the expected guide line EL may be automatically discontinued. In this way, it can be prevented that the visibility of the parking guide lines PL is compromised because of the expected guide line EL and the indicator guide line DL. Thereby, excessively complicated display in the screen can be prevented, and the driving operation can be more easily performed, thereby improving convenience of the driver.

Moreover, as described above, according the vehicle maneuver assistance device 10 displays converted images based on the image data outputted from the cameras 11_a_, 11_b_, 11_c_, and 11_d_, and guide display superimposed thereon, and in addition, a help display HELP in which a series of driving operations constituting the parking operation is displayed, such that the one or more of the driving operation which correspond to the currently performing operation is emphasized. Accordingly, the driver can easily perform the driving operation which is necessary at an appropriate timing according to the relative positions of the rectangular parking frame PW and the vehicle. Thereby, the driver can recognize the series of driving operations through the beginning to the end of the parking operation. Thereby, convenience of the driver can be improved.

Moreover, by displaying the help display HELP at a position so as not to interfere with the area of the display in which the guide displays are superimposed, the driver can appropriately recognize the help display HELP, while easily visually comparing the help display HELP and the converted images representing the actual external surrounding area.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle maneuver assistance device comprising:

a plurality of imaging units that images an external environment of a present-vehicle, and outputs resulting original images;

a converter that performs a view point conversion on the original images and outputs resulting converted images;

a display unit provided in an interior of the present-vehicle;

a steering angle status value detector which detects status values of the steering angle representing an actual steering angle of the present-vehicle, and outputs a steering angle status value;

a display controller that causes the display unit to display the converted image, and, overlaid thereon, a guidance display which assists a parking maneuver of the present-vehicle, wherein the display controller controls the guidance display according to the steering angle status value, so that the guidance display includes:

an initial positioning guide line representing an initial location of the present-vehicle at the beginning of the parking maneuver; and a steering-switching start positioning guide line representing a starting location of a quick steering direction switching.

2. The vehicle maneuver assistance device according to claim 1, wherein:

the display controller controls the guidance display so that, when the parking maneuver is a parallel parking, a parallel parking initial positioning guide line is displayed as the initial positioning guide line; and the parallel parking initial positioning guide line is arranged so that, when the parallel parking initial positioning guide line is positioned at one of corner parts of a parking frame closest to the present-vehicle, the present-vehicle is positioned at an appropriate parallel parking initial location.

3. The vehicle maneuver assistance device according to claim 1, wherein:

the display controller controls the guidance display so that, when the parking maneuver is a back-in parking, a backup parking initial positioning guide line is displayed as the initial positioning guide line; and the backup parking initial positioning guide line is arranged so that, when the backup parking initial positioning guide line is positioned at an essentially central position of the parking frame, the present-vehicle is positioned at an appropriate back-in parking initial location.

4. A vehicle maneuver assistance device comprising:

a plurality of imaging units that images an external environment of a present-vehicle, and outputs resulting original images;

a display unit provided in an interior of the present-vehicle;

a steering angle status value detector which detects status values of the steering angle representing an actual steering angle of the present-vehicle, and outputs a steering angle status value;

a display controller that is capable of causing the display unit to display the converted image and, overlaid thereon, a guidance display which assists a parking maneuver of the present-vehicle, and at least one of a prediction guidance display representing a driving course of the present-vehicle predicted according to the steering angle status value, and an indicator guidance display representing a location apart from the present-vehicle by a predetermined distance, wherein the display controller clears a display of the prediction guidance display and the indicator guidance display, when a predetermined parking maneuver is performed.

5. A vehicle maneuver assistance device comprising: a plurality of imaging units that images an external environment of a present-vehicle, and outputs resulting images;

a display unit provided in an interior of the present-vehicle; and a display controller that causes the display unit to display the images and, overlaid thereon, a guidance display which assists a parking maneuver of the present-vehicle, wherein:

the display controller causes the display unit to display a help display including instructions for a maneuver operation during the parking maneuver; and the display controller causes the display unit to emphasize, in accordance with a present-vehicle state of an actual shift position and a degree of the steering angle, the display corresponding to a present operation among a plurality of operations included in the maneuver operation.

6. The vehicle maneuver assistance device according to claim 5, wherein the display controller, when emphasizing the display corresponding to the present operation, increases a contrast of the corresponding display.

7. The vehicle maneuver assistance device according to claim 5, wherein the display controller, when emphasizing the display corresponding to the present operation, increases a size of the corresponding display.

8. The vehicle maneuver assistance device according to claim 5, wherein the display controller, when emphasizing the display corresponding to the present operation, changes a color of the corresponding display.

9. The vehicle maneuver assistance device according to claim 5, wherein the display controller arranges the help display at a position not interfering with the guidance display.

10. The vehicle maneuver assistance device according to claim 1, wherein the converted images are displayed on the display screen by a predetermined combination set in advance, a predetermined combination according to command signals output from an operating switch, or a predetermined combination according to detection signals output from the steering angle status value detector.

11. The vehicle maneuver assistance device according to claim 1, wherein the converted images are one of a front view of the present-vehicle, the rear view of the present-vehicle, the side view of the present-vehicle, the mirror view of the present-vehicle, and the ground view of the present-vehicle.

12. The vehicle maneuver assistance device according to claim 4, wherein the converted images are displayed on the display screen by a predetermined combination set in advance, a predetermined combination according to command signals output from an operating switch, or a predetermined combination according to detection signals output from the steering angle status value detector.

13. The vehicle maneuver assistance device according to claim 4, wherein the converted images are one of a front view of the present-vehicle, the rear view of the present-vehicle, the side view of the present-vehicle, the mirror view of the present-vehicle, and the ground view of the present-vehicle.

* * * * *